US012812563B2

(12) United States Patent
MolavianJazi et al.

(10) Patent No.: US 12,812,563 B2
(45) Date of Patent: Nov. 24, 2026

(54) ENERGY BUFFER INFORMATION FOR AN ENERGY STATUS REPORT

(71) Applicant: Samsung Electronics Co., Ltd., Suwon-si (KR)

(72) Inventors: Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/587,709

(22) Filed: Feb. 26, 2024

(65) Prior Publication Data

US 2024/0306098 A1 Sep. 12, 2024

Related U.S. Application Data

(60) Provisional application No. 63/451,402, filed on Mar. 10, 2023.

(51) Int. Cl.
*H04W 52/36* (2009.01)
*H04W 72/21* (2023.01)

(52) U.S. Cl.
CPC ......... *H04W 52/365* (2013.01); *H04W 72/21* (2023.01)

(58) Field of Classification Search
CPC .................................................. H04W 52/365
See application file for complete search history.

(56) References Cited

U.S. PATENT DOCUMENTS 8,254,326 B2 * 8/2012 Hsu ..................... H04W 52/365 370/468
10,098,075 B2 * 10/2018 Wang .................... H04W 52/38
(Continued)

FOREIGN PATENT DOCUMENTS

CN 102469495 A 5/2012
KR 101946991 B1 2/2019

OTHER PUBLICATIONS

International Search Report and Written Opinion issued Jun. 21, 2024 regarding International Application No. PCT/KR2024/002989, 7 pages.
(Continued)

*Primary Examiner* — Guang W Li

(57) ABSTRACT

A method of a user equipment (UE) in a wireless communication system is provided. The method includes identifying a condition for providing an energy status report (ESR) and determining one or more values of an available energy level corresponding to one or more time instances. A first value of the available energy level, from the one or more values, at a first time instance, from the one or more time instances, is determined based on a first value of a maximum transmit energy level at the first time instance. The first value of the maximum transmit energy level is determined based on the first time instance. The method further includes determining a first ESR comprising the one or more values of the available energy level and the corresponding one or more time instances, determining uplink resources for transmission of a first uplink channel with the first ESR, and transmitting the first uplink channel with the first ESR in the uplink resources.

20 Claims, 14 Drawing Sheets

(56) References Cited

U.S. PATENT DOCUMENTS

| | | | | |
|---|---|---|---|---|
| 2006/0013182 | A1* | 1/2006 | Balasubramanian | H04L 5/0044 370/343 |
| 2012/0207112 | A1 | 8/2012 | Kim | |
| 2012/0224552 | A1* | 9/2012 | Feuersanger | H04L 5/0007 370/329 |
| 2018/0014302 | A1* | 1/2018 | Asterjadhi | H04W 52/365 |
| 2021/0037483 | A1 | 2/2021 | Ahn et al. | |
| 2021/0144652 | A1* | 5/2021 | Gheorghiu | H04W 52/365 |
| 2022/0295422 | A1* | 9/2022 | Wang | H04W 52/365 |
| 2023/0031429 | A1* | 2/2023 | Khoshnevisan | H04W 52/365 |
| 2023/0041095 | A1* | 2/2023 | Zhou | H04B 7/0619 |
| 2023/0041768 | A1 | 2/2023 | Liu et al. | |
| 2023/0180146 | A1* | 6/2023 | Takeda | H04W 52/146 455/522 |
| 2023/0209393 | A1* | 6/2023 | Sen | H04W 28/0268 370/329 |
| 2024/0073830 | A1* | 2/2024 | Sridharan | H04W 52/146 |
| 2024/0196394 | A1* | 6/2024 | Guo | H04W 52/365 |
| 2024/0292343 | A1* | 8/2024 | Hooli | H04W 52/367 |
| 2025/0063626 | A1* | 2/2025 | Elshafie | H04W 52/0216 |
| 2025/0227750 | A1* | 7/2025 | Yang | H04W 72/569 |

OTHER PUBLICATIONS

Fujitsu, "Discussion on power domain enhancements", 3GPP TSG RAN WG1 Meeting #112, R1-2300759, Feb. 2023, 5 pages.

Qualcomm Incorporated, "Power-domain enhancements", 3GPP TSG-RAN WG1 Meeting #112, R1-2301442, Feb. 2023, 38 pages.

Moderator (Nokia), "Final FL summary of power domain enhancements (AI 9.14.2)", 3GPP TSG RAN WG1 #112, R1-2301873, Feb. 2023, 129 pages.

"5G; NR; Physical channels and modulation (3GPP TS 38.211 version 17.4.0 Release 17)", ETSI TS 138 211 V17.4.0, Jan. 2023, 141 pages.

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"3rd Generation Partnership Project; Technical Specification Group Radio Access Network; NR; Physical layer measurements (Release 17)", 3GPP TS 38.215 V17.4.0, Dec. 2023, 27 pages.

"5G; NR; Medium Access Control (MAC) protocol specification (3GPP TS 38.321 version 17.3.0 Release 17)", ETSI TS 138 321 V17.3.0, Jan. 2023, 254 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

"5G; NR; NR and NG-RAN Overall description; Stage-2 (3GPP TS 38.300 version 17.3.0 Release 17)", ETSI TS 138 300 V17.3.0, Jan. 2023, 213 pages.

"3rd Generation Partnership Project; Technical Specification Group Services and System Aspects; Study on Ambient power-enabled Internet of Things (Release 19)", 3GPP TR 22.840 V1.0.0, Dec. 2022, 99 pages.

"3rd Generation Partnership Project; Technical Specification Group Radio Access Network; NR; Requirements for support of radio resource management (Release 18)", 3GPP TS 38.133 V18.0.0, Dec. 2022, 5854 pages.

"5G; NR; User Equipment (UE) radio transmission and reception; Part 1: Range 1 Standalone (3GPP TS 38.101-1 version 17.8.0 Release 17)", ETSI TS 138 101-1 V17.8.0, Jan. 2023, 660 pages.

"5G; NR; User Equipment (UE) radio transmission and reception; Part 2: Range 2 Standalone (3GPP TS 38.101-2 version 17.8.0 Release 17)", ETSI TS 138 101-2 V17.8.0, Jan. 2023, 227 pages.

"5G; NR; User Equipment (UE) radio transmission and reception; Part 3: Range 1 and Range 2 Interworking operation with other radios (3GPP TS 38.101-3 version 17.8.0 Release 17)", ETSI TS 138 101-3 V17.8.0, Jan. 2023, 1069 pages.

Supplementary European Search Report dated Apr. 28, 2026, in connection with European Patent Application No. 24771123.7, 9 pages.

* cited by examiner

ENERGY BUFFER INFORMATION FOR AN ENERGY STATUS REPORT

CROSS-REFERENCE TO RELATED AND CLAIM OF PRIORITY

The present application claims priority under 35 U.S.C. § 119(e) to: U.S. Provisional Patent Application No. 63/451,402 filed on Mar. 10, 2023, which is hereby incorporated by reference in its entirety.

TECHNICAL FIELD

The present disclosure relates generally to wireless communication systems and, more specifically, the present disclosure is related to apparatuses and methods for energy buffer information for an energy status report (ESR).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to energy buffer information for an ESR.

In an embodiment, a method of a user equipment (UE) in a wireless communication system is provided. The method includes identifying a condition for providing an ESR and determining one or more values of an available energy level corresponding to one or more time instances. A first value of the available energy level, from the one or more values, at a first time instance, from the one or more time instances, is determined based on a first value of a maximum transmit energy level at the first time instance. The first value of the maximum transmit energy level is determined based on the first time instance. The method further includes determining a first ESR comprising the one or more values of the available energy level and the corresponding one or more time instances, determining uplink resources for transmission of a first uplink channel with the first ESR, and transmitting the first uplink channel with the first ESR in the uplink resources.

In another embodiment, a UE is provided. The UE includes a processor configured to identify a condition for providing an ESR and determine one or more values of an available energy level corresponding to one or more time instances. A first value of the available energy level, from the one or more values, at a first time instance, from the one or more time instances, is determined based on a first value of a maximum transmit energy level at the first time instance. The first value of the maximum transmit energy level is determined based on the first time instance. The processor is further configured to determine a first ESR comprising the one or more values of the available energy level and the corresponding one or more time instances and determine uplink resources for transmission of a first uplink channel with the first ESR. The UE further includes a transceiver operably coupled with the processor. The transceiver is configured to transmit the first uplink channel with the first ESR in the uplink resources.

In yet another embodiment, a base station is provided. The base station includes a processor configured to determine uplink resources for reception of a first uplink channel and a transceiver operably coupled with the processor. The transceiver is configured to receive the first uplink channel in the uplink resources. The processor is further configured to determine, from a first energy status report (ESR) provided by the first uplink channel, one or more values of an available energy level and corresponding one or more time instances. A first value of the available energy level, from the one or more values, at a first time instance, from the one or more time instances, is based on a first value of a maximum transmit energy level at the first time instance. The first value of the maximum transmit energy level is based on the first time instance.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
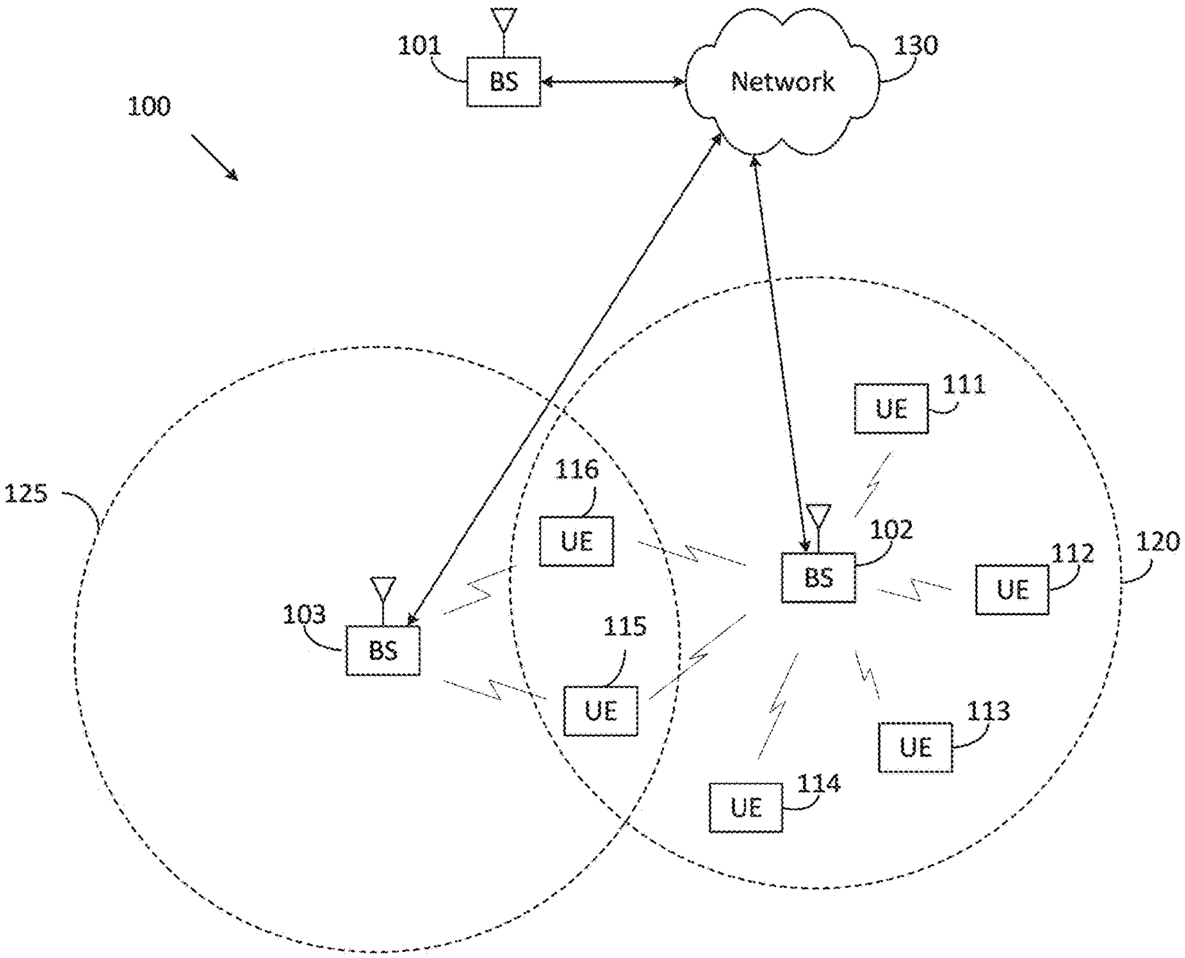
FIG. 1 illustrates an example wireless network according to embodiments of the present disclosure.

FIGS. 1-15, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v17.4.0, "NR; Physical channels and modulation;" [2] 3GPP TS 38.212 v17.4.0, "NR; Multiplexing and channel coding;" [3] 3GPP TS 38.213 v17.4.0, "NR; Physical layer procedures for control;" [4] 3GPP TS 38.214 v17.4.0, "NR; Physical layer procedures for data;" [5] 3GPP TS 38.215 v17.4.0, "NR; Physical layer measurements;" [6] 3GPP TS 38.321 v17.3.0, "NR; Medium Access Control (MAC) protocol specification;" [7] 3GPP TS 38.331 v17.2.0, "NR; Radio Resource Control (RRC) protocol specification;" [8] 3GPP TS 38.300 v17.3.0, "NR; NR and NG-RAN Overall Description; Stage 2;" [9] 3GPP TR 22.840 v1.0.0, "Study on Ambient power-enabled Internet of Things (Rel-19);" 3GPP TS 38.133 v18.0.0, "NR; Requirements for support of radio resource management;" and 3GPP TS 38.101-1/2/3, v17.8.0, "NR; User Equipment (UE) radio transmission and reception."

Figure 2:
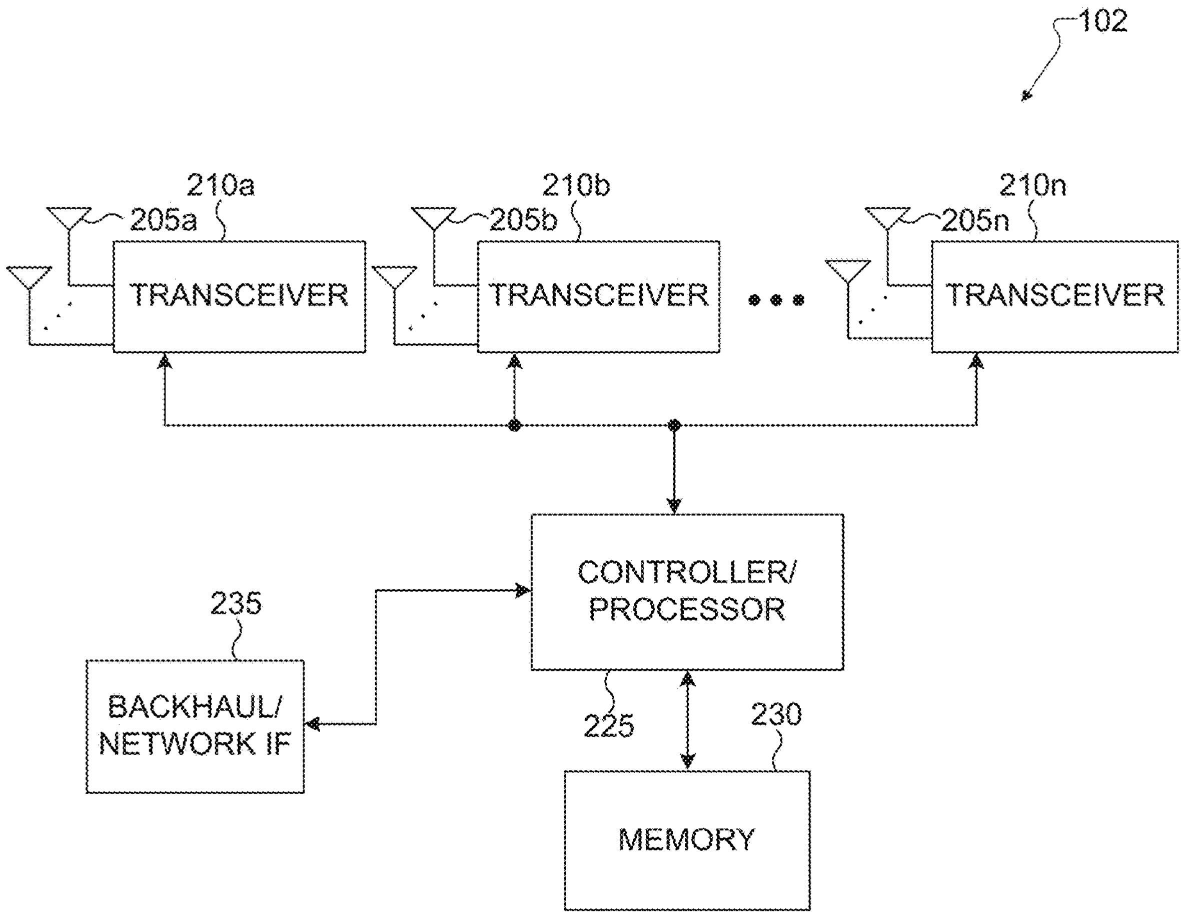
FIG. 2 illustrates an example gNodeB (gNB) according to embodiments of the present disclosure.
Figure 3:
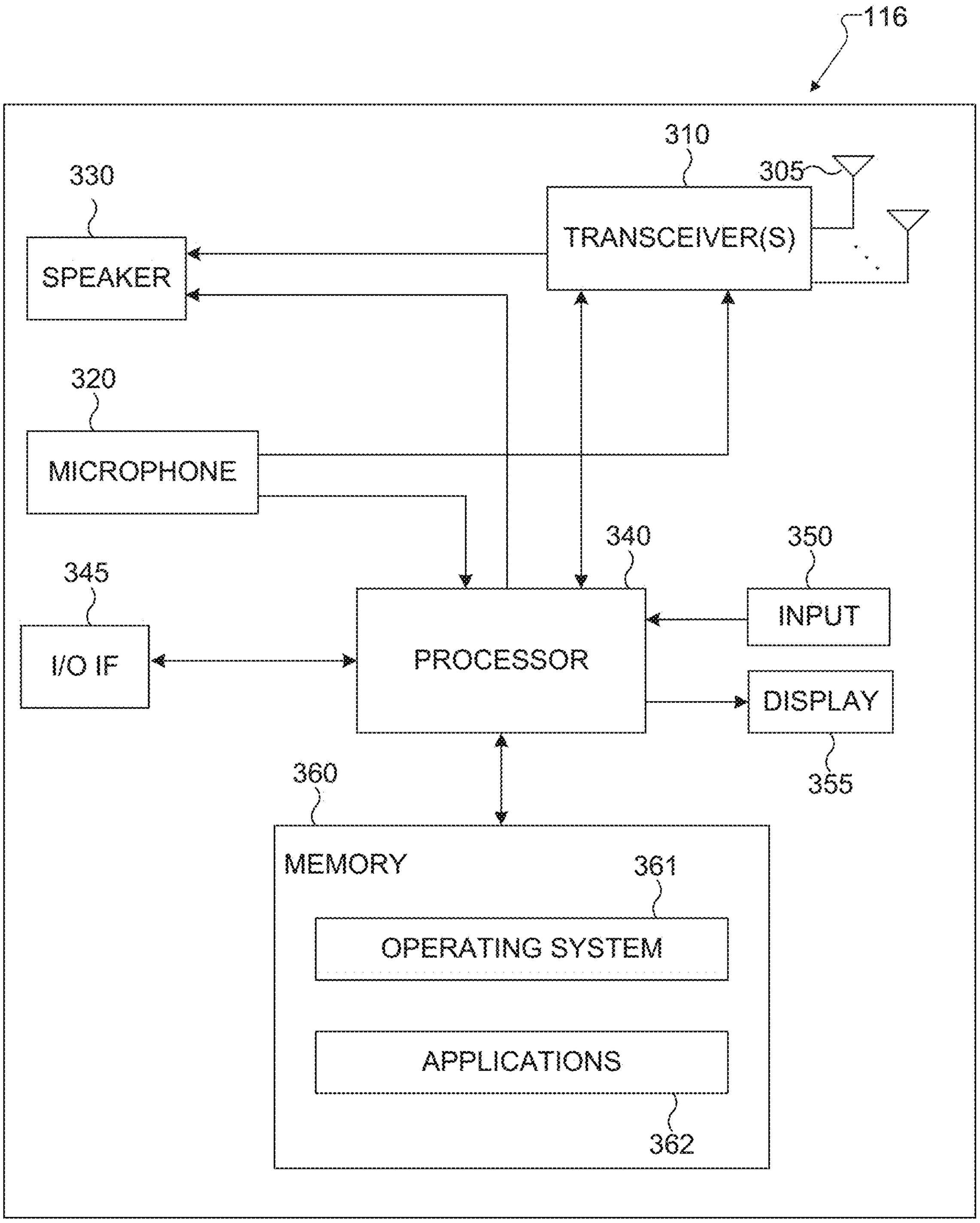
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, a smartwatch, activity tracker, or the like, or an internet of things (IoT) device such as a thermostat, smart appliance, smart hub, display device, smart speaker, media player or receiver, switch, plug, light, sensor, etc. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer, vending machine, or certain types of IoT devices).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for using energy buffer information for an ESR. In certain embodiments, one or more of the BSs 101-103 include circuitry, programing, or a combination thereof to support energy buffer information for an ESR.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support usage of energy buffer information for an ESR. Any of a wide variety of other functions could be supported in the gNB 102 by the controller/processor 225.

The controller/processor 225 is also capable of executing programs and other processes resident in the memory 230, such as processes to support usage of energy buffer information for an ESR. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing energy buffer information for an ESR as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices, including an IoT device. For example, the UE 116 may not include one or more of display 355, speaker 330, microphone 320, input 350, I/O IF 345 and may operate using a low power processor 340 and/or memory 360.

Figure 4A:
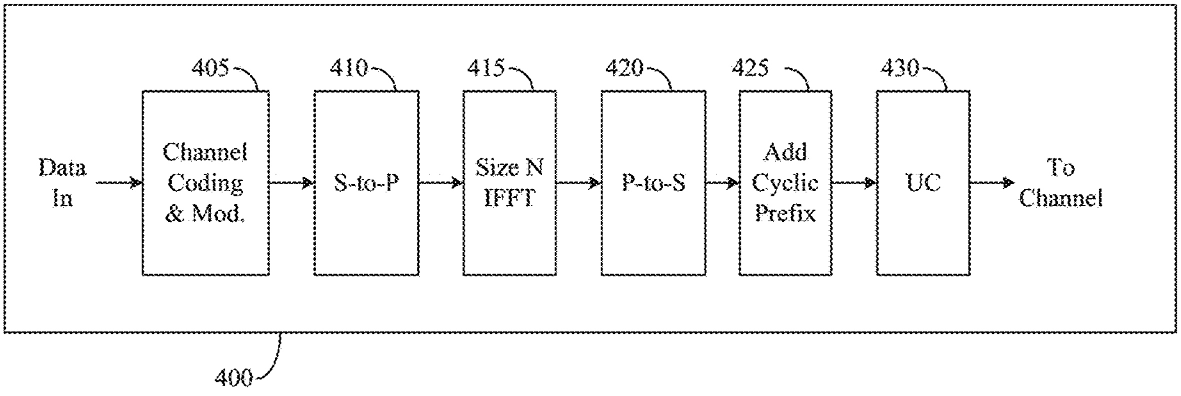
FIGS. 4A and 4B illustrate an example of a wireless transmit and receive paths according to embodiments of the present disclosure.
Figure 4B:
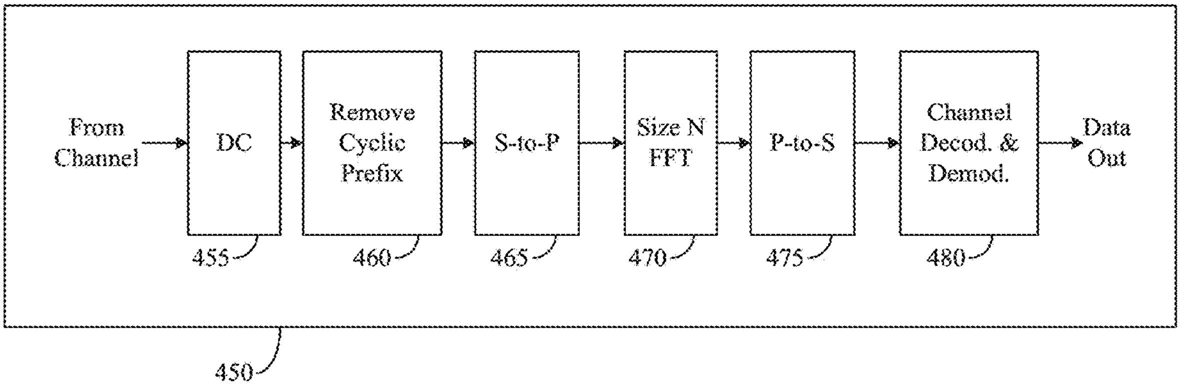

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 is configured to transmit an ESR based on energy buffer information as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or SRS. In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5:
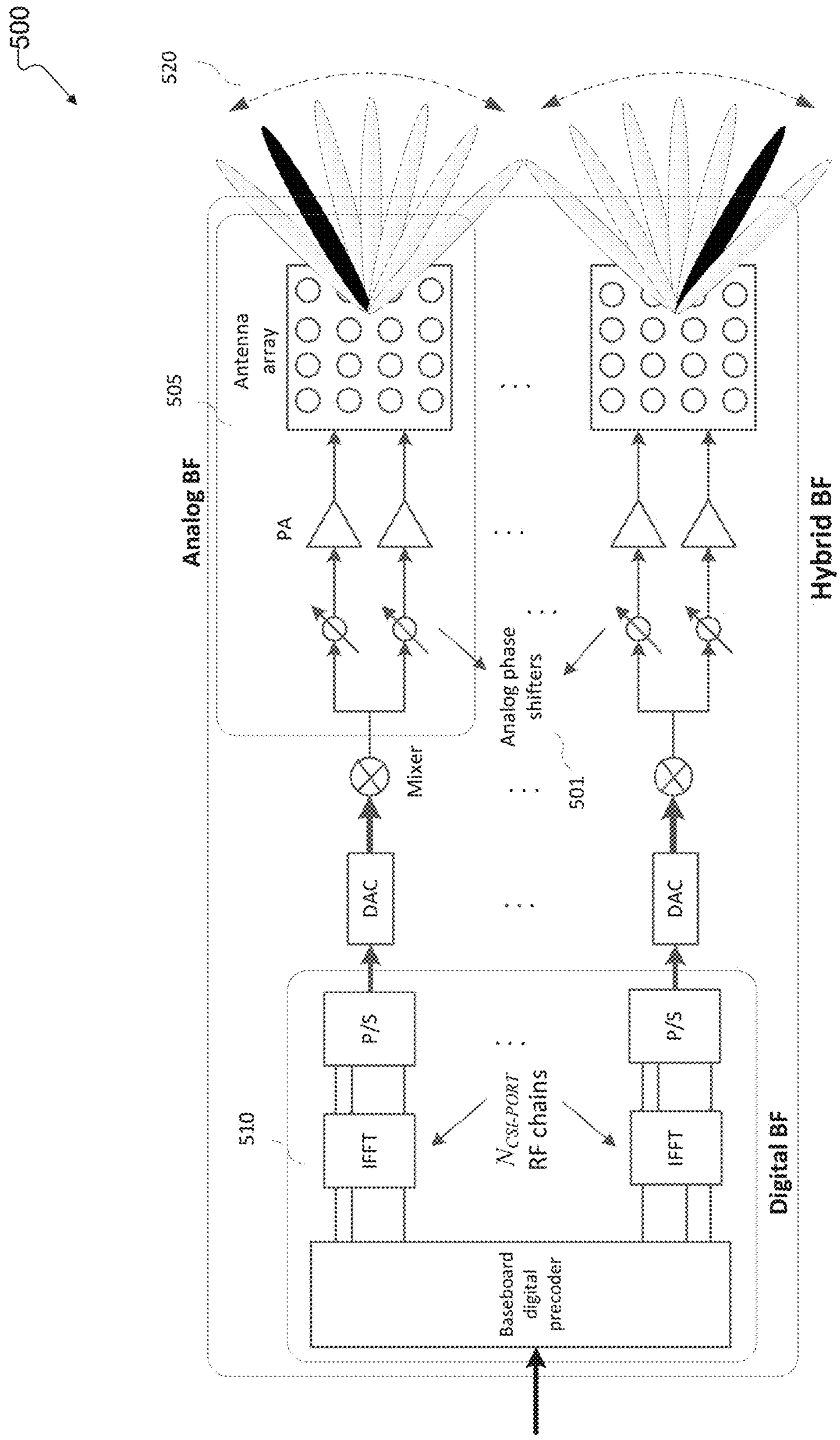
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antennas 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI\text{-}PORT}$. A digital beamforming unit 510 performs a linear combination across $N_{CSI\text{-}PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 500 for beamforming is for illustration only and other embodiments can be used without departing from the scope of the present disclosure.

The present disclosure relates to a pre-5th-Generation (5G) or 5G or beyond 5G communication system to be provided for supporting one or more of: higher data rates, lower latency, higher reliability, improved coverage, massive connectivity, and so on. Various embodiments apply to UEs operating with other RATs and/or standards, such as different releases/generations of 3GPP standards (including beyond 5G, 5G Advanced, 6G, and so on), IEEE standards (such as 802.16 WiMAX and 802.11 Wi-Fi and so on), and so forth.

Ambient IoT (A-IoT) devices are ultra-low-complexity UEs with very small form factor and low-cost design that operate without a common battery that can be manually replaced or recharged. Instead, A-IoT devices can be battery-less or with a small battery (such as a small capacitor) that operate based on energy harvesting from RF waveforms or other ambient energy sources.

At least for A-IoT devices operating with energy harvesting and having limited energy storage, the energy buffer level of the device can be viewed as a random process that is not known at the gNB. Therefore, if the resources scheduled for a UE to transmit, such as for UE-originated transmissions may not be aligned with occasions when the UE has sufficient available energy, the UE cannot follow the scheduling from the gNB due to energy shortage. Such events would lead to wasting of system resources and also create unnecessary signaling overhead.

Therefore, embodiments of the present disclosure recognize there is a need for a UE to report an energy buffer level to a gNB.

There is also a need to define different triggers for a UE to report an energy buffer based on UE determination or gNB indication.

Finally, there is a need to define procedures for a UE to obtain resources and to enable mechanisms for the UE to report an energy buffer, including low-power methods and waveforms.

The present disclosure provides methods and apparatus for a UE to report an energy buffer level to a gNB. In exemplary embodiments, the UE is an A-IoT device operating with energy harvesting (EH) and with limited energy storage/battery capability (such as a capacitor).

The embodiments apply to any deployments, verticals, or scenarios including in FR1 or FR2, with enhanced mobile broadband (eMBB), ultra reliable low latency communications (URLLC) and industrial internet of things (IIOT), massive machine-type communications (mMTC) and IoT including LTE NB-IoT or NR IoT or Ambient IoT (A-IoT), with sidelink/Vehicle to anything (V2X) communications, in unlicensed/shared spectrum (NR-U), for non-terrestrial networks (NTN), for aerial systems such as unmanned aerial vehicles (UAVs) such as drones, for private or non-public networks (NPN), for operation with reduced capability (RedCap) UEs, multi-cast broadcast services (MBS), and so on.

Embodiments of the disclosure are summarized in the following and are fully elaborated further herein. Combinations of the embodiments are also applicable but are not described in detail for brevity.

Energy status report (ESR) for A-IoT devices: In one embodiment, a UE can report information for an energy/power buffer level to a gNB. For example, the UE 116 can be an A-IoT device. For example, the energy status report (ESR) can be a small message, such as 1 or 2 bits corresponding to 2 or 4 energy levels and be provided as uplink control information (UCI). or in a MAC CE, or the ESR can include more detailed information and be provided by a MAC CE or by RRC information. The reported ESR may refer to the UE 116 energy buffer either before or after a transmission of a channel, such as a PUCCH or a PUSCH, providing the ESR. That time reference for the ESR can be defined in the specifications for system operation or be indicated to the UE 116 by higher layer information such as RRC information, or by other L1/L2 signaling such as a trigger or wake-up or discovery indication for example LP-WUS for the UE or for a group of UEs including the UE, or by a system-information-like signaling such as an operation information (OI) that provides information corresponding to one or multiple rounds of operations that applies to the UE or a group of UEs including the UE, or can correspond to a time resource reported by the UE. Different modes of ESR may be supported, such as short ESR, long ESR, or extended ESR, wherein the UE 116 can report the UE 116 energy buffer for one or multiple time-instances and using different number of bits.

Triggers for ESR transmission: In one embodiment, a UE can receive an indication by a serving gNB (or by a Reader UE or an intermediate node such as relay or repeater or IAB node, and so on) that triggers an ESR or the UE 116 can be configured by the gNB 102 to transmit the ESR in a periodic manner based on a periodicity, or in a semi-persistent manner with a periodicity along with activation and deactivation, such as with a periodicity after reception of the network (NW) trigger or wake-up/discovery/LP-WUS or other indication until an end/complete operation determination or indication or until other NW indication or with activation/deactivation that are event-based or based on UE determination, or per UE decision based on UE measurements, or based on an event such as on changes in UE operation mode/state/energy that can be defined in the specifications of the system operation or indicated by the gNB 102 by higher layer signaling. For example, the event can be a change in an energy state by a predefined or configured amount from the gNB 102 and, when the event occurs, the UE 116 provides an ESR using associated resources; otherwise, the UE 116 does not provide an ESR. For an ESR report that is triggered by the gNB 102, the triggering indication can be by modified/repurposed signaling or by new dedicated signaling that can be UE-specific, such as by a network trigger or discovery/inventory signal or channel that is UE-specific or by a DL reception such as PDCCH order or PDSCH that is UE-specific or by a downlink control information (DCI) provided by a physical downlink control channel (PDCCH) that the UE 116 monitors according to a USS set or resources indicated by UE-dedicated RRC information, or UE-group-common such as by a network trigger or discovery/inventory signal or channel that is UE-common or by a DL reception such as PDCCH order or PDSCH that is UE-common or by a DCI provided by a PDCCH that the UE 116 monitors according to a CSS set or in resources indicated by common RRC information such as a SIB, or can be an L2 control information such as a MAC-CE provided in a PDSCH, or can be an information element or field in a PDCCH order for a group of UEs, or can be an L1 control information such as L1-DCI that is multiplexed in a PDSCH, and so on. The UE 116 transmits a channel providing a triggered ESR when the UE 116 is provided UL resources for the channel. Further, a UE experiencing energy shortage may choose to not transmit an ESR, even when triggered and provided UL resources to do so. A serving gNB may then infer the energy shortage at the UE 116 based on the absence of any reception in the UL resources in response to the triggering of an ESR.

L2 mechanisms to report the ESR: In one embodiment, a UE can report the ESR using a MAC CE, such as by a modified/new type of power headroom report (PHR), for example by re-interpreting the $P_{CMAX,f,c}$ field, or the MPE field, or by adding a new field for UE power class, or by a new MAC-CE command. For example, the MAC CE can be provided by an uplink channel for example a PUSCH, such as a PUSCH that is in response to a wake-up/discovery/inventory signaling for example an LP-WUS or the like or can be a Msg3 PUSCH or a MsgA PUSCH that is in response to a PDCCH order. In another example, the MAC-CE can be provided by any PUSCH (without a priori information by the gNB or the Reader UE), such as when the UE determines a condition for ESR transmission.

L1 mechanisms to report the ESR: In one embodiment, a UE can report ESR as an L1 uplink control information (UCI). The UE 116 can provide the ESR in a PUCCH transmission or can include/multiplex the ESR in a PUSCH transmission. For example, resources for a PUCCH or PUSCH transmission can be provided by system information (SIB), or common or dedicated higher layer information or signaling. For example, the UE 116 can be provided a PUCCH resource, a periodicity, and an offset to provide ESR. The UE 116 may transmit the PUCCH (only) when an event associated with the ESR, such as an energy change larger than a predetermined level, occurs. For example, when a configured or indicated PUCCH transmission for a ESR would overlap with a PUSCH transmission, the UE 116 (always or sometimes, such as based on UE determination or gNB indication or based on an event) provides the ESR, or the UE 116 can skip multiplexing ESR as UCI and instead provide ESR in a MAC CE when the aforementioned event occurs. For example, the UE 116 can use a dedicated signature, such as a dedicated cyclic shift or phase shift or cover code or scrambling/spreading sequence (as a form of code division multiplexing (CDM)), to distinguish its transmission from those of other UEs.

Low-power methods for transmission of ESR: In one embodiment, a UE can transmit a PUSCH or PUCCH that includes the ESR using OFDM waveform or using a low-power waveform, such as an On-Off keying (OOK) modulation or waveform, for example 1-bit OOK or multi-bit OOK, possibly based on OFDM-overlaid OOK or OOK-overlaid OFDM, such as when an OOK modulation/waveform is provided within an OFDM waveform or vice versa. In addition, other methods for reduced power consumption may be used, such as DFT-s-OFDM waveform or pi/2-BPSK modulation or amplitude shift keying (ASK) modulation or waveform. Moreover, for a UE without active RF components, the UE 116 can transmit ESR by modulating the information bits corresponding to ESR on the received DL waveform and backscattering the modulated waveform.

Transmission of ESR in sidelink operation: In one embodiment, when a UE is operating in a sidelink-like mode, such as when communicating with a "Reader" UE, the UE 116 may transmit the ESR in a physical sidelink feedback channel (PSFCH), a physical shared control channel (PSCCH), or a PSSCH to the "Reader" UE, and any related signaling can be based on sidelink communication. In another example, SL-like operation may be used by a Reader UE, while some or all transmissions or receptions to/from the A-IoT UE are based on Uu interface, instead of PC5 interface for SL. For example, Uu-based channels such as PDSCH or PUSCH and so on are used for side-link purposes. In another example, a Reader UE can operate as a relay node, for example, similar to a network-controlled repeater (NCR) node with L1 amplify and forward or an integrated access and backhaul (IAB) node with L2/L3 decode and forward.

In the following, a parameter referenced in italics is provided by higher layers such as by RRC.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE (such as the UE 116) can determine CSI-RS transmission parameters through DL control signaling or higher layer signaling, such as radio resource control (RRC) signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB 102 can configure the UE 116 to transmit signals on a cell within an active UL bandwidth part (BWP) of the cell UL BW.

UCI includes HARQ acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE 116 to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a time division duplex (TDD) system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE 116 may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE 116 (such as the UE 116) may assume that synchronization signal (SS)/physical broadcast channel block (also denoted as SSBs) transmitted with the same block index on the same center frequency location are quasi co-located with respect to Doppler spread, Doppler shift, average gain, average delay, delay spread, and, when applicable, spatial Rx parameters. The UE 116 may not assume quasi co-location for any other synchronization signal SS/PBCH block transmissions.

In absence of CSI-RS configuration, and unless otherwise configured, the UE 116 may assume PDSCH DM-RS and SSB to be quasi co-located with respect to Doppler shift, Doppler spread, average delay, delay spread, and, when applicable, spatial Rx parameters. The UE 116 may assume that the PDSCH DM-RS within the same code division multiplexing (CDM) group is quasi co-located with respect to Doppler shift, Doppler spread, average delay, delay spread, and spatial Rx. The UE 116 may also assume that DM-RS ports associated with a PDSCH are QCL with QCL type A, type D (when applicable) and average gain. The UE 116 may further assume that no DM-RS collides with the SS/PBCH block.

The UE 116 can be configured with a list of up to M transmission configuration indication (TCI) State configurations within the higher layer parameter PDSCH-Config to decode PDSCH according to a detected PDCCH with DCI intended for the UE 116 and the given serving cell, where M depends on the UE 116 capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE 116 receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $$\left(n + 3N_{slot}^{subframe,\mu}\right).$$

In some examples, the term 'beam' is used to refer to a spatial filter for transmission or reception of a signal or a channel. For example, a beam (of an antenna) can be a main lobe of the radiation pattern of an antenna array, or a sub-array or an antenna panel, or of multiple antenna arrays, sub-arrays or panels combined, that are used for such transmission or reception. In various examples, a beam such as a Tx beam or an Rx beam is referred to as a spatial filter, such as a spatial transmission filter or a spatial reception filter.

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by MIB or a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE 116 determines a common TDD UL-DL frame configuration of a serving cell by receiving a SIB such as a SIB1 when accessing the cell from RRC_IDLE or by RRC signaling when the UE 116 is configured with SCells or additional SCGs by an IE ServingCellConfigCommon in RRC_CONNECTED. The UE 116 determines a dedicated TDD UL-DL frame configuration using the IE ServingCell-Config when the UE 116 is configured with a serving cell, e.g., add or modify, where the serving cell may be the SpCell or an SCell of a master cell group (MCG) or secondary cell group (SCG). A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE 116 by group common DCI format such as DCI F2_0 where slotFormats are defined in [REF3, TS 38.213].

The Synchronization Signal and PBCH block (SSB) includes primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network 130. During a half-frame, different SSBs may be transmitted in different spatial directions (i.e., using different beams, spanning the coverage area of a cell).

Within the frequency span of a carrier, multiple SSBs can be transmitted. The physical cell IDs (PCIs) of SSBs transmitted in different frequency locations do not have to be unique, i.e., different SSBs in the frequency domain can have different PCIs. However, when an SSB is associated with a remaining minimum system information (RMSI), the SSB is referred to as a Cell-Defining SSB (CD-SSB). A PCell is associated to a CD-SSB located on the synchronization raster.

Polar coding is used for PBCH. The UE 116 may assume a band-specific sub-carrier spacing for the SSB unless a network has configured the UE 116 to assume a different sub-carrier spacing. PBCH symbols carry its own frequency-multiplexed demodulation reference signal (DMRS). QPSK modulation is used for PBCH.

Measurement time resource(s) for SSB-based Reference signal received power (RSRP) measurements may be confined within a SSB Measurement Time Configuration (SMTC). The SMTC configuration provides a measurement window periodicity/duration/offset information for UE radio resource management (RRM) measurement per carrier frequency. For intra-frequency connected mode measurement, up to two measurement window periodicities can be configured. For RRC_IDLE, a single SMTC is configured per carrier frequency for measurements. For inter-frequency mode measurements in RRC_CONNECTED, a single SMTC is configured per carrier frequency. Note that if RSRP is used for L1-RSRP reporting in a CSI report, the measurement time resource(s) restriction provided by the SMTC window size is not applicable. Similarly, measurement time resource(s) for received signal strength indicator (RSSI) are confined within SMTC window duration. If no measurement gap is used, RSSI is measured over OFDM symbols within the SMTC window duration. If a measurement gap is used, RSSI is measured over OFDM symbols corresponding to overlapped time span between SMTC window duration and minimum measurement time within the measurement gap.

Link adaptation (AMC: adaptive modulation and coding) with various modulation schemes and channel coding rates is applied to the PDSCH. The same coding and modulation is applied to all groups of resource blocks belonging to the same L2 protocol data unit (PDU) scheduled to one user within one transmission duration and within a MIMO codeword.

For channel state estimation purposes, the UE 116 may be configured to measure CSI-RS and estimate the downlink channel state based on the CSI-RS measurements. The UE 116 feeds the estimated channel state back to the gNB 102 to be used in link adaptation.

Measurement reports are required to enable the scheduler to operate in both uplink and downlink. These include transport volume and measurements of a UEs radio environment.

Uplink buffer status reports (BSR) are needed to provide support for QoS-aware packet scheduling. In NR, uplink buffer status reports refer to the data that is buffered in for a group of logical channels (LCG) in the UE 116. Four formats are used for reporting in uplink:

A short format to report only one BSR (of one LCG);

A flexible long format to report several BSRs (up to all eight LCGs);

An extended short format to report one BSR (of one LCG);

An extended long format to report several BSRs (up to all 256 LCGs).

NOTE: The Extended versions of the BSR formats can only be used by integrated access and backhaul (IAB) nodes.

Uplink buffer status reports are transmitted using MAC signalling. When a BSR is triggered (e.g., when new data arrives in the transmission buffers of the UE 116), a Scheduling Request (SR) can be transmitted by the UE 116 (e.g., when no resources are available to transmit the BSR).

The Buffer Status reporting (BSR) procedure is used to provide the serving gNB with information about UL data volume in the MAC entity.

RRC configures the following parameters to control the BSR:

periodicBSR-Timer;

retxBSR-Timer;

logicalChannelSR-Delay TimerApplied;

logicalChannelSR-DelayTimer;

logicalChannelSR-Mask;

logicalChannelGroup, logicalChannelGroup-IAB-Ext;

sdt-LogicalChannelSR-DelayTimer.

Each logical channel may be allocated to an LCG using the logicalChannelGroup. The maximum number of LCGs is eight except for IAB-mobile terminals (MTs) configured with logicalChannelGroup-IAB-Ext, for which the maximum number of LCGs is 256.

The MAC entity determines the amount of UL data available for a logical channel according to the data volume calculation procedure in TSs 38.322 and 38.323.

A BSR shall be triggered if any of the following events occur for activated cell group:

UL data, for a logical channel which belongs to an LCG, becomes available to the MAC entity; and either this UL data belongs to a logical channel with higher priority than the priority of any logical channel containing available UL data which belong to any LCG; or none of the logical channels which belong to an LCG contains any available UL data, in which case the BSR is referred herein to as 'Regular BSR';

UL resources are allocated, and number of padding bits is equal to or larger than the size of the Buffer Status Report MAC CE plus its sub header, in which case the BSR is referred to herein as 'Padding BSR';

retxBSR-Timer expires, and at least one of the logical channels which belong to an LCG contains UL data, in which case the BSR is referred to herein as 'Regular BSR';

periodicBSR-Timer expires, in which case the BSR is referred to herein as 'Periodic BSR'.

NOTE 1: When Regular BSR triggering events occur for multiple logical channels simultaneously, each logical channel triggers one separate Regular BSR.

For Regular BSR, the MAC entity shall:

2> if the BSR is triggered for a logical channel for which logicalChannelSR-DelayTimerApplied with value true is configured by upper layers and small data transmission (SDT) procedure is not on-going:

2> start or restart the logicalChannelSR-DelayTimer.

2> else if BSR is triggered for a logical channel for which logicalChannelSR-DelayTimerApplied with value true is configured by upper layers and SDT procedure is on-going:

2> start or restart logicalChannelSR-DelayTimer with the value as configured by the sdt-LogicalChannelSR-DelayTimer.

2> else:

2> if running, stop the logicalChannelSR-Delay Timer.

For Regular and Periodic BSR, the MAC entity for which logicalChannelGroup-IAB-Ext is not configured by upper layers shall:

2> if more than one LCG has data available for transmission when the MAC PDU containing the BSR is to be built:

2> report Long BSR for all LCGs which have data available for transmission.

2> else:

2> report Short BSR.

For Regular and Periodic BSR, the MAC entity for which logicalChannelGroup-IAB-Ext is configured by upper layers shall:

2> if more than one LCG has data available for transmission when the MAC PDU containing the BSR is to be built:

2> if the maximum LCG ID among the configured LCGs is 7 or lower:

3> report Long BSR for all LCGs which have data available for transmission.

2> else:

3> report Extended Long BSR for all LCGs which have data available for transmission.

2> else:

2> report Extended Short BSR.

For Padding BSR, the MAC entity for which logicalChannelGroup-IAB-Ext is not configured by upper layers shall:

2> if the number of padding bits is equal to or larger than the size of the Short BSR plus its subheader but smaller than the size of the Long BSR plus its subheader:

2> if more than one LCG has data available for transmission when the BSR is to be built:

3> if the number of padding bits is equal to the size of the Short BSR plus its subheader:

4> report Short Truncated BSR of the LCG with the highest priority logical channel with data available for transmission.

3> else:

4> report Long Truncated BSR of the LCG(s) with the logical channels having data available for transmission following a decreasing order of the highest priority logical channel (with or without data available for transmission) in each of these LCG(s), and in case of equal priority, in increasing order of Logical Channel Group ID (LCGID).

2> else:

3> report Short BSR.

2> else if the number of padding bits is equal to or larger than the size of the Long BSR plus its subheader:

2> report Long BSR for all LCGs which have data available for transmission.

For Padding BSR, the MAC entity for which logicalChannelGroup-IAB-Ext is configured by upper layers shall:

2> if the number of padding bits is equal to or larger than the size of the Extended Short BSR plus its sub header but smaller than the size of the Extended Long BSR plus its sub header:

2> if more than one LCG has data available for transmission when the BSR is to be built:

3> if the number of padding bits is smaller than the size of the Extended Long Truncated BSR with zero Buffer Size field plus its sub header:

4> report Extended Short Truncated BSR of the LCG with the highest priority logical channel with data available for transmission.

3> else:

4> report Extended Long Truncated BSR of the LCG(s) with the logical channels having data available for transmission following a decreasing order of the highest priority logical channel (with or without data available for transmission) in each of these LCG(s), and in case of equal priority, in increasing order of LCGID.

2> else:

3> report Extended Short BSR.

2> else if the number of padding bits is equal to or larger than the size of the Extended Long BSR plus its sub header:

2> report Extended Long BSR for all LCGs which have data available for transmission.

For BSR triggered by retxBSR-Timer expiry, the MAC entity evaluates that the logical channel that triggered the BSR is the highest priority logical channel that has data available for transmission at the time the BSR is triggered.

The MAC entity shall:

2> if the Buffer Status reporting procedure determines that at least one BSR has been triggered and not cancelled:

2> if UL-SCH resources are available for a new transmission and the UL-SCH resources can accommodate the BSR MAC CE plus its subheader as a result of logical channel prioritization:

3> instruct the Multiplexing and Assembly procedure to generate the BSR MAC CE(s);

3> start or restart periodicBSR-Timer except when all the generated BSRs are long or short Truncated or Extended long or short Truncated BSRs;

3> start or restart retxBSR-Timer.

2> if a Regular BSR has been triggered and logicalChannelSR-DelayTimer is not running:

3> if there is no UL-SCH resource available for a new transmission; or

3> if the MAC entity is configured with configured uplink grant(s) and the Regular BSR was triggered for a logical channel for which logicalChannelSR-Mask is set to false; or 3> if the UL-SCH resources available for a new transmission do not meet the link control protocol (LCP) mapping restrictions configured for the logical channel that triggered the BSR:

4> trigger a Scheduling Request.

NOTE 2: UL-SCH resources are regarded as available if the MAC entity has been configured with, receives, or determines an uplink grant. If the MAC entity has determined at a given point in time that UL-SCH resources are available, this need not imply that UL-SCH resources are available for use at that point in time.

A MAC PDU shall contain at most one BSR MAC CE, even when multiple events have triggered a BSR. The Regular BSR and the Periodic BSR shall have precedence over the padding BSR.

The MAC entity shall restart retxBSR-Timer upon reception of a grant for transmission of new data on any UL-SCH.

All triggered BSRs may be cancelled when the UL grant(s) can accommodate all pending data available for transmission but is not sufficient to additionally accommodate the BSR MAC CE plus its sub header. All BSRs triggered prior to MAC PDU assembly shall be cancelled when a MAC PDU is transmitted and this PDU includes a Long, Extended Long, Short, or Extended Short BSR MAC CE which contains buffer status up to (and including) the last event that triggered a BSR prior to the MAC PDU assembly.

NOTE 3: MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

NOTE 4: Void.

NOTE 5: If a HARQ process is configured with cg-RetransmissionTimer and if the BSR is already included in a MAC PDU for transmission on configured grant by this HARQ process, but not yet transmitted by lower layers, it is up to UE implementation how to handle the BSR content.

The UE 116 is allowed to set its configured maximum output power $P_{CMAX,f,c}$ for carrier f of serving cell c in each slot. The configured maximum output power $P_{CMAX,f,c}$ is set within the following bounds:

$$P_{CMAX\_L,f,c} \leq P_{CMAX,f,c} \leq P_{CMAX\_H,f,c}$$

with:

$$P_{CMAX\_L,f,c} = \text{MIN}\{P_{EMAX,c} - \Delta T_{C,c},\ (P_{PowerClass} - \Delta P_{PowerClass}) - \text{MAX}(\text{MAX}(MPR_c + \Delta MPR_c,\ A-MPR_c) + \Delta T_{IB,c} + \Delta T_{C,c} + \Delta T_{RxSRS},\ P-MPR_c)\},$$

$$P_{CMAX\_H,f,c} = \text{MIN}\{P_{EMAX,c},\ P_{PowerClass} - \Delta P_{PowerClass}\}.$$

Power headroom reports (PHR) provide support for power-aware packet scheduling. In NR, three PHR types are supported: a first for PUSCH transmission, a second for PUSCH and PUCCH transmission in an LTE Cell Group in evolved non-standalone dual connectivity (EN-DC), and a third for SRS transmission. In case of carrier aggregation (CA), when a UE has no transmission on an activated SCell, a reference power for reference parameters of a signal/channel transmission is used by the UE 116 to provide a virtual report. To enable a network to be aware of a reduction in transmission power by a UE, a PHR report may also contain Power Management Maximum Power Reduction (P-MPR, [REF11, TS 38.101-2]) information that UE uses to ensure compliance with the Maximum Permissible Exposure (MPE) exposure regulation for FR2 for limiting RF exposure on human body. A UE provides a PHR using MAC CE in a PUSCH.

A power headroom report can include the following information:

Type 1 power headroom: the difference between the nominal UE maximum transmit power and the estimated power for UL-SCH transmission per activated serving cell;

Type 2 power headroom: the difference between the nominal UE maximum transmit power and the estimated power for UL-SCH and PUCCH transmission on SpCell of the other MAC entity (i.e. evolved universal terrestrial radio access (E-UTRA) MAC entity in EN-DC, NE-DC, and NGEN-DC cases);

Type 3 power headroom: the difference between the nominal UE maximum transmit power and the estimated power for SRS transmission per activated serving cell;

MPE P-MPR: the power backoff to meet the MPE FR2 requirements for a serving cell operating on FR2.

RRC controls Power Headroom reporting by configuring the following parameters:

phr-Periodic Timer;
phr-ProhibitTimer;
phr-Tx-PowerFactorChange;
phr-Type 2OtherCell;
phr-ModeOtherCG;
multiplePHR;
mpe-Reporting-FR2;
mpe-ProhibitTimer;
mpe-Threshold;
memberOfN;
mpe-Resource PoolToAddModList;
twoPHRMode.

A PHR is triggered if any of the following events occur:

phr-ProhibitTimer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in this MAC entity when the MAC entity has UL resources for new transmission;

NOTE 1: The path loss variation for one cell assessed herein is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in [REF7, TS 38.331].

phr-PeriodicTimer expires;

upon configuration or reconfiguration of the power headroom reporting functionality by upper layers, which is not used to disable the function;

activation of an Scell of any MAC entity with configured uplink of which firstActiveDownlinkBWP-Id is not set to dormant BWP;

activation of a secondary cell group (SCG);

addition of the PSCell except if the SCG is deactivated (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-$MPR_c$ as specified in TS 38.101-1, TS 38.101-2, and TS 38.101-3 [REF11]) for this cell has changed more than phr-Tx-PowerFactorChange dB since the last transmission of a PHR when the MAC entity had UL resources allocated for transmission or PUCCH transmission on this cell.

Upon switching of activated BWP from dormant BWP to non-dormant DL BWP of an Scell of any MAC entity with configured uplink;

if mpe-Reporting-FR2 is configured, and mpe-Prohibit-Timer is not running:

the measured P-MPR applied to meet FR2 MPE requirements as specified in TS 38.101-2 [REF11] is equal to or larger than mpe-Threshold for at least one activated FR2 Serving Cell since the last transmission of a PHR in this MAC entity; or the measured P-MPR applied to meet FR2 MPE requirements as specified in TS 38.101-2 [REF11] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity, in which case the PHR is referred to herein as 'MPE P-MPR report'.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

NOTE 3: If a HARQ process is configured with cg-RetransmissionTimer and if the PHR is already included in a MAC PDU for transmission on configured grant by this HARQ process, but not yet transmitted by lower layers, it is up to UE implementation how to handle the PHR content.

Figure 6:
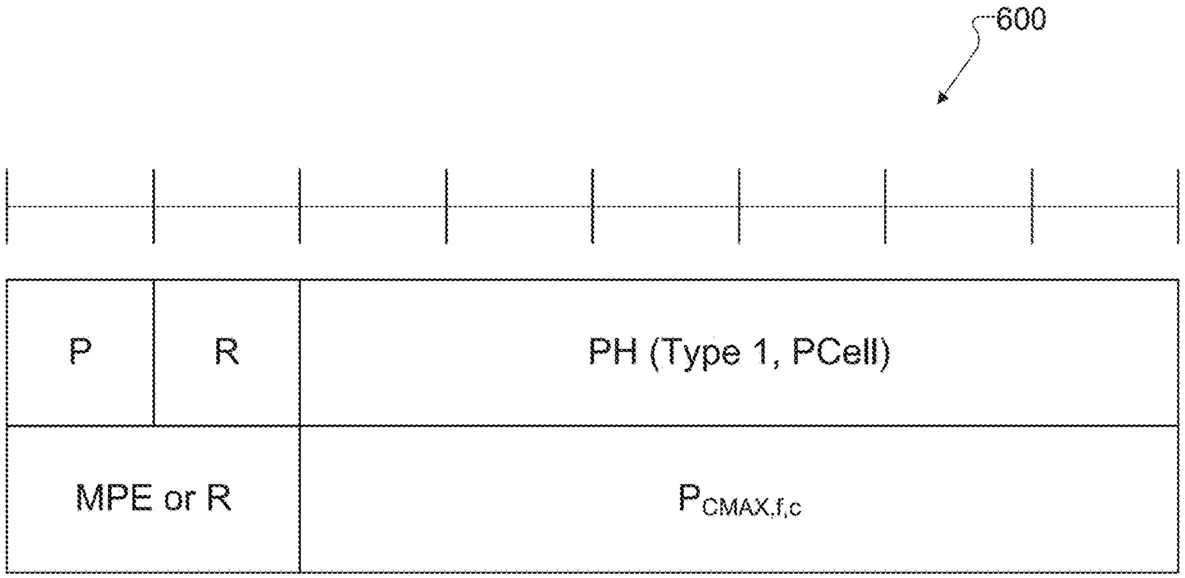
FIG. 6 illustrates a diagram for single entry power headroom report (PHR) medium access control (MAC) control element (CE) according to embodiments of the present disclosure.

FIG. 6 illustrates a diagram 600 for PHR MAC CE according to embodiments of the present disclosure. For example, diagram 600 for PHR MAC CE could be utilized by any of the Ues 111-116 of FIG. 1. This example is for illustration only and other embodiments can be used without departing from the scope of the present disclosure.

If the MAC entity has UL resources allocated for a new transmission the MAC entity shall:

2> if it is the first UL resource allocated for a new transmission since the last MAC reset:

2> start phr-Periodic Timer.

2> if the Power Headroom reporting procedure determines that at least one PHR has been triggered and not cancelled; and 2> if the allocated UL resources can accommodate the MAC CE for PHR which the MAC entity is configured to transmit, plus its sub header, as a result of LCP as defined in clause 5.4.3.1 of [REF6, TS 38.321]:

2> if multiplePHR with value true is configured:

2> else (i.e. Single Entry PHR format is used):

3> if this MAC entity is configured with twoPHRMode:

4> obtain two values of the Type 1 power headroom from the physical layer for the corresponding uplink carrier of the Pcell.

3> else:

4> obtain the value of the Type 1 power headroom from the physical layer for the corresponding uplink carrier of the Pcell.

3> obtain the value for the corresponding $P_{CMAX,f,c}$ field from the physical layer;

3> if mpe-Reporting-FR2 is configured and this Serving Cell operates on FR2:

4> obtain the value for the corresponding MPE field from the physical layer.

3> if mpe-Reporting-FR2-r17 is configured and this Serving Cell operates on FR2 and this Serving Cell is associated to this MAC entity:

4> obtain the value for the corresponding MPE; field from the physical layer;

4> obtain the value for the corresponding Resource; field from the physical layer.

3> instruct the Multiplexing and Assembly procedure to generate and transmit the Enhanced Single entry PHR if this MAC entity is configured with mpe-Reporting-FR2-r17 or the Enhanced Single Entry PHR for multiple TRP MAC CE if this MAC entity is configured with twoPHRMode or the Single Entry PHR MAC CE otherwise based on the values reported by the physical layer.

2> if this PHR report is an MPE P-MPR report:

3> start or restart the mpe-ProhibitTimer;

3> cancel triggered MPE P-MPR reporting for Serving Cells included in the PHR MAC CE.

2> start or restart phr-Periodic Timer;

2> start or restart phr-ProhibitTimer;

2> cancel all triggered PHR(s).

All triggered PHRs shall be cancelled when there is an ongoing SDT procedure, and the UL grant(s) can accommodate all pending data available for transmission but is not sufficient to additionally accommodate the PHR MAC CE plus its sub header.

The Single Entry PHR MAC CE is identified by a MAC sub header with LCID as specified in Table 6.2.1-2 of [REF6, TS 38.321, v17.3.0].

With reference to FIG. 6, it has a fixed size and includes two octets defined as follows:

R: Reserved bit, set to 0;

Power Headroom (PH): This field indicates the power headroom level. The length of the field is 6 bits. The reported PH and the corresponding power headroom levels are shown in Table 1 below (the corresponding measured values in dB are specified in [REF10, TS 38.133, v17.8.0], reproduced in Table 2);

P: If mpe-Reporting-FR2 is configured and the Serving Cell operates on FR2, the MAC entity shall set this field to 0 if the applied P-MPR value, to meet MPE requirements, as specified in TS 38.101-2 [REF11], is less than P-MPR_00 as specified in TS 38.133 [REF10] and to 1 otherwise. If mpe-Reporting-FR2 is not configured or the Serving Cell operates on FR1, this field indicates whether power backoff is applied due to power management (as allowed by $P\text{-}MPR_c$ as specified in TS 38.101-1, TS 38.101-2, and TS 38.101-3 [REF11]). The MAC entity shall set the P field to 1 if the corresponding $P_{CMAX,f,c}$ field would have had a different value if no power backoff due to power management had been applied;

$P_{CMAX,f,c}$: This field indicates the $P_{CMAX,f,c}$ (as specified in TS 38.213 [REF3]) used for calculation of the preceding PH field. The reported $P_{CMAX,f,c}$ and the corresponding nominal UE transmit power levels are shown in Table 3 (the corresponding measured values in dBm are specified in [REF10, TS 38.133], reproduced in Table 4);

MPE: If mpe-Reporting-FR2 is configured, and the Serving Cell operates on FR2, and if the P field is set to 1, this field indicates the applied power backoff to meet MPE requirements, as specified in [REF11, TS 38.101-2]. This field indicates an index to Table 5 and the corresponding measured values of P-MPR levels in dB are specified in [REF11, TS 38.133], reproduced in Table 6. The length of the field is 2 bits. If mpe-Reporting-FR2 is not configured, or if the Serving Cell operates on FR1, or if the P field is set to 0, R bits are present instead.

TABLE 1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| . . . | . . . |
| 60 | POWER_HEADROOM_60 |
| 61 | POWER_HEADROOM_61 |
| 62 | POWER_HEADROOM_62 |
| 63 | POWER_HEADROOM_63 |

The power headroom reporting range is from −32 . . . +38 dB. Table 2 defines the report mapping.

TABLE 2

Power headroom report mapping

| Reported value | Measured quantity value (dB) |
|---|---|
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| . . . | . . . |
| POWER_HEADROOM_53 | 20 □ PH □ 21 |
| POWER_HEADROOM_54 | 21 □ PH □ 22 |
| POWER_HEADROOM_55 | 22 □ PH □ 24 |
| POWER_HEADROOM_56 | 24 □ PH □ 26 |
| POWER_HEADROOM_57 | 26 □ PH □ 28 |
| POWER_HEADROOM_58 | 28 □ PH □ 30 |
| POWER_HEADROOM_59 | 30 □ PH □ 32 |
| POWER_HEADROOM_60 | 32 □ PH □ 34 |
| POWER_HEADROOM_61 | 34 □ PH □ 36 |
| POWER_HEADROOM_62 | 36 □ PH □ 38 |
| POWER_HEADROOM_63 | PH ≥ 38 |

TABLE 3

| Nominal UE transmit power level for PHR | |
|---|---|
| $P_{CMAX,f,c}$ | Nominal UE transmit power level |
| 0 | PCMAX_C_00 |
| 1 | PCMAX_C_01 |
| 2 | PCMAX_C_02 |
| . . . | . . . |
| 61 | PCMAX_C_61 |
| 62 | PCMAX_C_62 |
| 63 | PCMAX_C_63 |

The UE 116 is required to report the UE configured maximum output power ($P_{CMAX,c,f}$) together with the power headroom. The $P_{CMAX,c,f}$ reporting range is defined from 29 dBm to 33 dBm with 1 dB resolution. Table 4 defines the reporting mapping.

TABLE 4

| Mapping of $P_{CMAX,c,f}$ | | |
|---|---|---|
| Reported value | Measured quantity value | Unit |
| PCMAX_C_00 | $P_{CMAX,c,f} < -29$ | dBm |
| PCMAX_C_01 | $-29 \le P_{CMAX,c,f} < -28$ | dBm |
| PCMAX_C_02 | $-28 \le P_{CMAX,c,f} < -27$ | dBm |
| . . . | . . . | . . . |
| PCMAX_C_61 | $31 \le P_{CMAX,c,f} < 32$ | dBm |
| PCMAX_C_62 | $32 \le P_{CMAX,c,f} < 33$ | dBm |
| PCMAX_C_63 | $33 \le P_{CMAX,c,f}$ | dBm |

TABLE 5

| Effective power reduction for MPE P-MPR | |
|---|---|
| MPE | Measured P-MPR value |
| 0 | P-MPR_00 |
| 1 | P-MPR_01 |
| 2 | P-MPR_02 |
| 3 | P-MPR_03 |

Table 6 defines the FR2 P-MPR report mapping.

TABLE 6

| Mapping of FR2 P-MPR | | |
|---|---|---|
| Reported value | Measured quantity value | Unit |
| P-MPR_00 | 3 □ PMP-R < 6 | dB |
| P-MPR_01 | 6 □ PMP-R < 9 | dB |
| P-MPR_02 | 9 □ PMP-R < 12 | dB |
| P-MPR_03 | PMP-R ≥ 12 | dB |

In recent years, Internet of Things (IoT) has attracted attention in wireless communications. More 'things' are expected to be interconnected for improving productivity efficiency and increasing comforts of life. Further reduction of size, complexity, and power consumption of IoT devices can enable the deployment of tens or even hundreds of billion IoT devices for various applications and provide added value across the entire value chain. It is impossible to power all the IoT devices by battery that needs to be replaced or recharged manually, which leads to high maintenance cost, serious environmental issues, and even safety hazards for some use cases (e.g., wireless sensor in electric power and petroleum industry).

Most of the existing wireless communication devices are powered by battery that needs to be replaced or recharged manually. The automation and digitalization of various industries open numbers of new markets requiring new IoT technologies of supporting battery-less devices with no energy storage capability or devices with energy storage that do not need to be replaced or recharged manually. The form factor of such devices must be reasonably small to convey the validity of target use cases.

Figure 7:
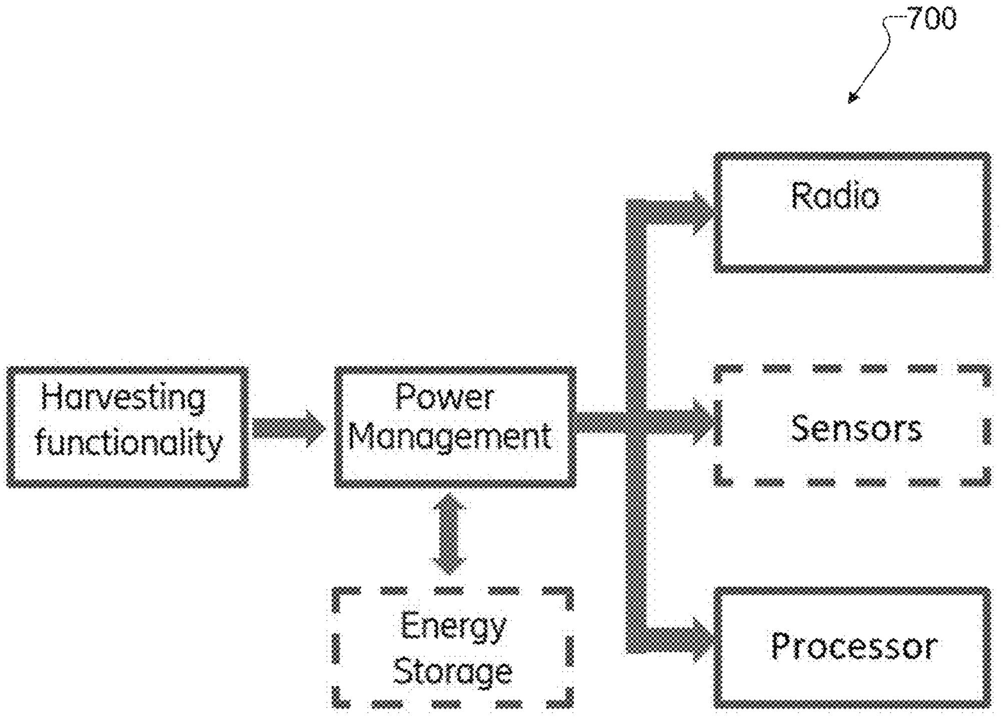
FIG. 7 illustrates a flow diagram of functionalities for ambient-power-enabled internet of things (A-IoT) devices according to embodiments of the present disclosure.
Figure 8A:
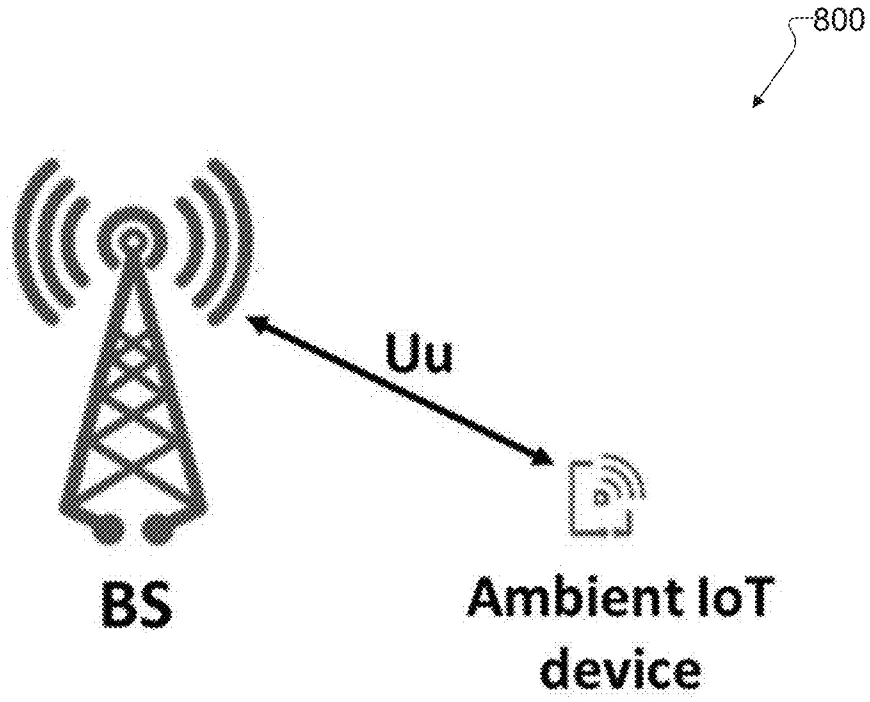
FIGS. 8A, 8B, 8C, and 8D illustrate diagrams for A-IoT devices according to embodiments of the present disclosure.
Figure 8B:
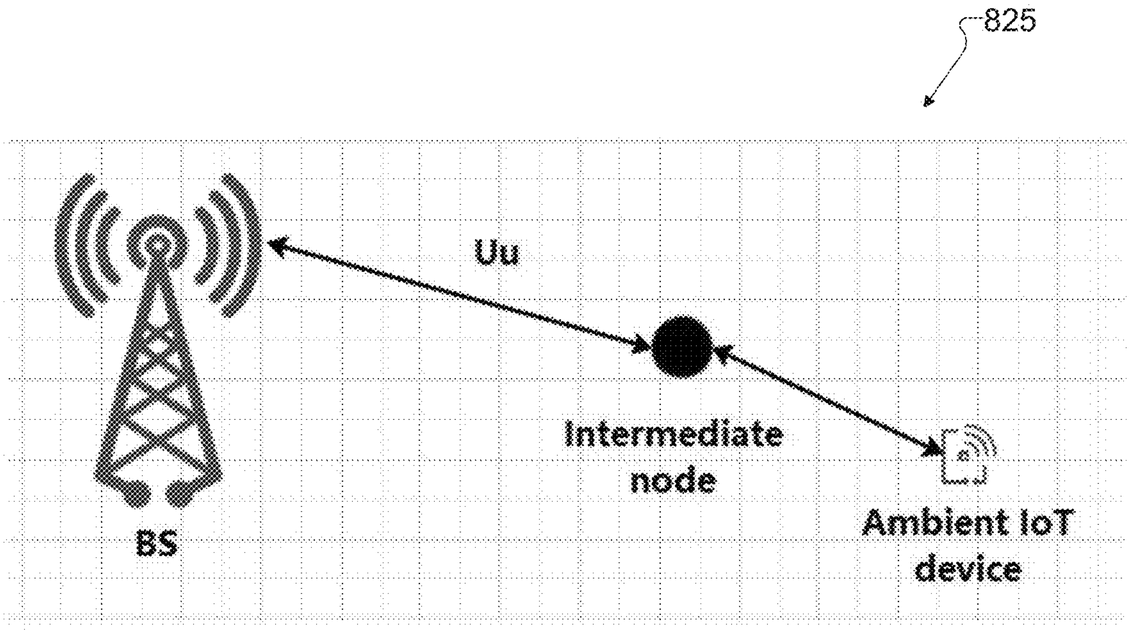
Figure 8C:
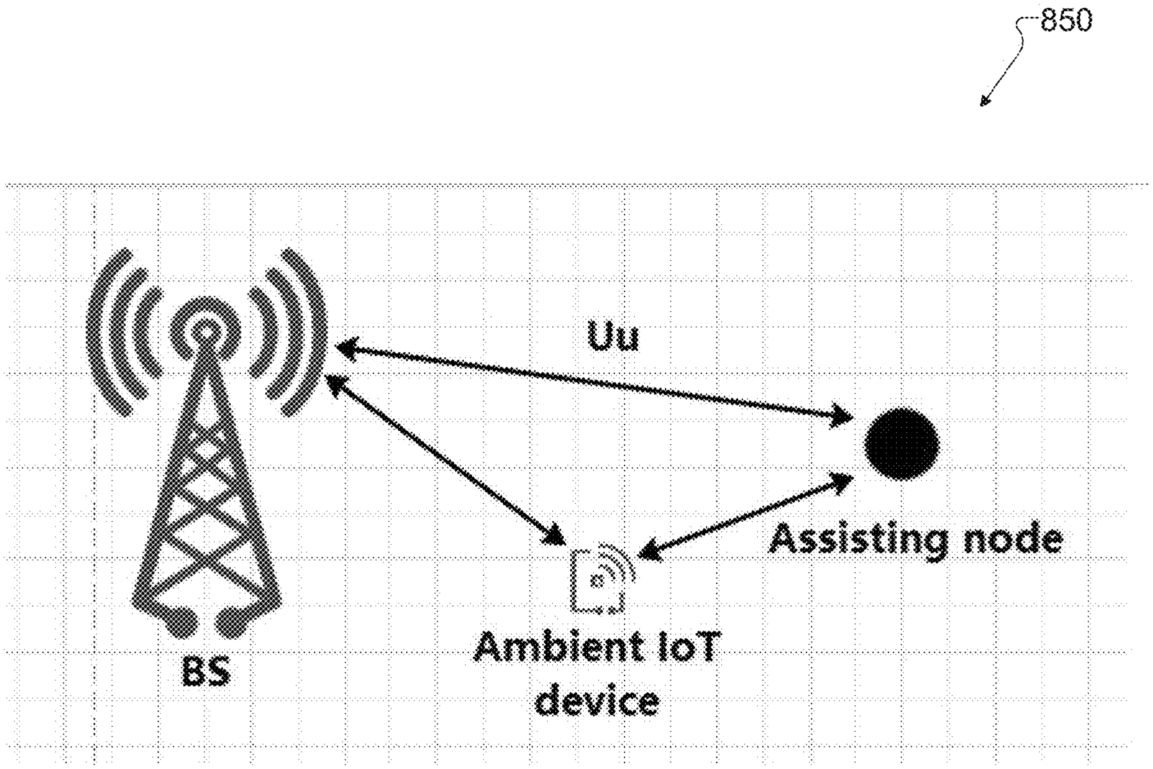
Figure 8D:
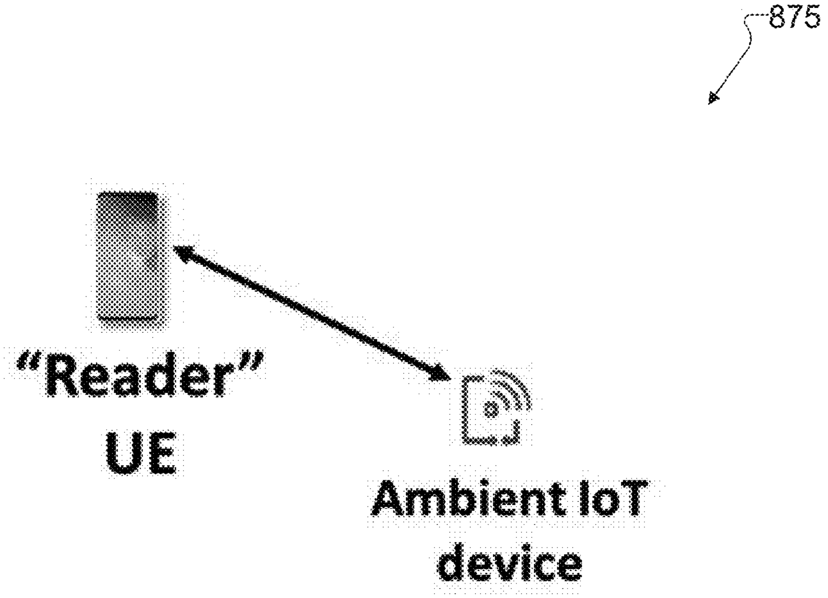
Figure 9A:
FIGS. 9A, 9B, 9C, and 9D illustrate diagrams for energy status report (ESR) formats according to embodiments of the present disclosure.
Figure 9B:
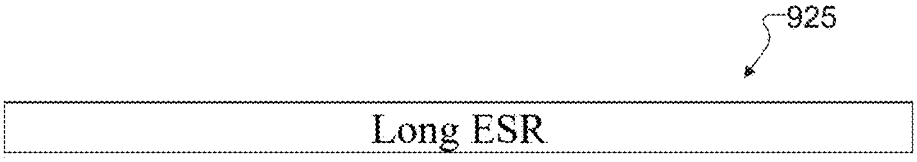
Figure 9C:
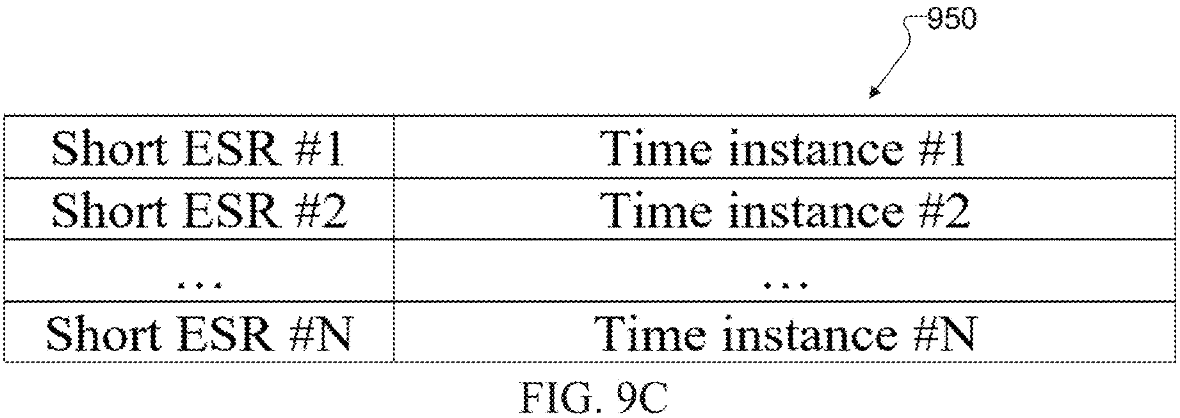
Figure 9D:
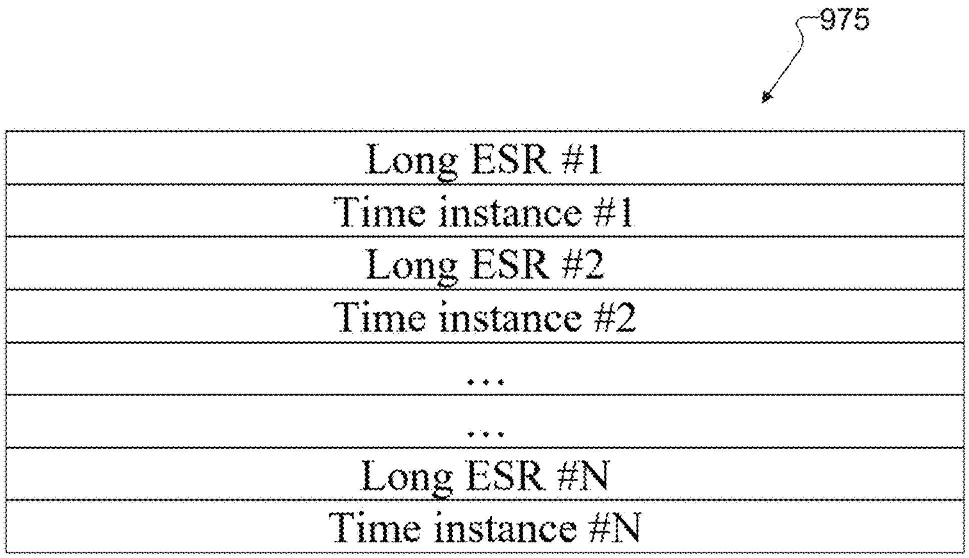

FIG. 7 illustrates a flow diagram 700 of functionalities for A-IoT devices according to embodiments of the present disclosure. For example, flow diagram 700 of functionalities for A-IoT devices can outline functionalities of the UE 114 of FIG. 1. This example is for illustration only and other embodiments can be used without departing from the scope of the present disclosure.

[REF9, TR 22.840] includes use cases, traffic scenarios, and device constraints of ambient power-enabled Internet of Things (A-IoT) and identifies new potential service requirements as well as new key performance indicators (KPIs). For brevity, ambient-power-enabled IoT is also referred to as ambient IoT (A-IoT).

An A-IoT device is an IoT device that is:

1 powered by energy harvesting, being either battery-less or with limited energy storage capability (e.g., using a capacitor) and the energy is provided through the harvesting of radio waves (including RF waveforms), light (including solar light or indoor light), motion, pressure, heat, or any other power source that could be seen suitable;

with low complexity, small size and lower capabilities and lower power consumption than previously defined 3GPP IoT devices (e.g., NB-IoT/eMTC devices);

maintenance free and can have long life span (e.g., more than 10 years).

An example type of application for A-IoT in [REF9, TR 22.840] is asset identification, which presently has to resort mainly to barcode and RFID in most industries. The main advantage of these two technologies is the ultra-low complexity and small form factor of the tags. However, the limited reading range of a few meters usually requires handheld scanning which leads to labor intensive and time-consuming operations, or RFID portals/gates which leads to costly deployments. Moreover, the lack of interference management scheme results in severe interference between RFID readers and capacity problems, especially in case of dense deployment. It is hard to support large-scale network with seamless coverage for RFID.

A group of use-cases evaluated in [REF9, TR 22.840] include asset inventory or tracking (such as automated warehousing, smart factory/market, logistics, lost items, and so on), wherein communication for an A-IoT UE is typically triggered by a discovery or trigger signal from the network 130 or a management platform, and the A-IoT UE usually responds by transmitting its identity (ID), possibly together with some location-related information. Some use-cases in this group include A-IoT UEs with low to moderate mobility.

Another group of use-cases evaluated in [REF9, TR 22.840] include use-cases for remote environmental monitoring (such as, electric grid, smart home/farm/city, base station machine room, and so on) wherein communication for an A-IoT UE is typically triggered by the A-IoT device and may include periodic or on-demand communication, such as the device ID usually along with some sensor measurement reports. Devices in this group of use-cases have typically no/low mobility.

Regarding the limited size and complexity required by practical applications for battery-less devices with no energy storage capability or devices with limited energy storage that do not need to be replaced or recharged manually, the output power of energy harvester is typically from 1 μW to a few hundreds of μW. Existing cellular devices may not work well with energy harvesting due to their peak power consumption of higher than 10 mW.

Since existing technologies cannot meet all the requirements of target use cases, A-IoT technology is evaluated and an associated number of connections and/or device density can be orders of magnitude higher than existing 3GPP IoT technologies. The A-IoT technology is intended to provide complexity and power consumption orders of magnitude lower than the existing 3GPP low power wide area (LPWA) technologies (such as RedCap, eMTC, IIoT, NR IoT, and LTE NB-IoT including with reduced peak Tx power) and can address use cases and scenarios that cannot otherwise be fulfilled based on existing 3GPP LPWA IoT technologies. Therefore, ultra-low complexity devices with ultra-low power consumption for the very-low-end IoT applications.

With reference to FIG. 7, example functionalities of an A-IoT device, where boxes/functionalities with solid edges are typically present (e.g., mandatory), while boxes/functionalities with dashed edges may or may not be present (e.g., optional) depending on the use-case, deployment, or implementation are shown.

A-IoT devices/UEs can be categorized at least in the following three device/UE types:

- Type-A devices: Pure battery-less devices with no energy storage capability at all, so completely dependent on the availability of an external source of energy (mainly RF waveform) and without any active hardware elements, therefore, operating based on passive hardware elements, e.g., via backscattering;
- Type-B devices: Devices with limited energy storage capability that do not need to be replaced or recharged manually (for example, small capacitors that are charged with energy harvesting from RF waveform or other energy sources such as light, heat, pressure, and so on) and without any active hardware elements, therefore, operating based on passive hardware elements, e.g., via backscattering;
- Type-C devices: Devices with limited energy storage capability that do not need to be replaced or recharged manually (for example, small capacitors that are charged with energy harvesting from RF waveform or other energy sources such as light, heat, pressure, and so on) and with active hardware elements.

An active hardware element may refer to an electronic component that supplies energy to a circuit or relies on an external power source to control or modify electrical signals. Examples include a voltage sources, current sources, transistors, silicon-controlled rectifiers, tunnel diodes, and so on. For example, transistors are able to amplify the power of a signal.

A passive hardware element may refer to an electronic component that (only) receives energy and does not provide any gain or amplification for an electrical signal, nor it can amplify, oscillate, or generate an electrical signal. Passive elements can dissipate the energy, or absorb/store the energy, for example, in an electric field or a magnetic field. Passive elements do not need any form of electrical power to operate. Examples of passive elements include resistors, inductors, and capacitors.

In another example, two different UE types can be considered:

- A type-I UE with ~1 μW peak power consumption, has energy storage, initial sampling frequency offset (SFO) up to $10^X$ ppm (for a certain value X, such as X=1 or 2 or 3), neither DL nor UL amplification in the device. The device's UL transmission is backscattered on a carrier wave provided externally.
- A Type-II UE with 100 μW or a few hundred μW peak power consumption, has energy storage, initial sampling frequency offset (SFO) up to $10^X$ ppm (for a certain value X, such as X=1 or 2 or 3), with DL and/or UL amplification in the device. The device's UL transmission may be generated internally by the device, or be backscattered on a carrier wave provided externally.

For example, a UE type between Type-I UE and Type-II UE may not be distinguished, and both UEs may operate based on same or similar procedures. For example, a Type-II UE may be categorized into two sub-Types, such as a Type-II-A UE where the device's UL transmission may be generated internally by the device, and a Type-II-B UE where the device's UL transmission may be backscattered on a carrier wave provided externally.

FIG. 8A, FIG. 8B, FIG. 8C, and FIG. 8D illustrate diagrams for A-IoT devices 800, 825, 850, and 875, respectively, according to embodiments of the present disclosure. For example, diagram 800, diagram 825, and diagram 850 can be employed by the BS 102 and the UE 116 in wireless network 100 of FIG. 1. In another example, diagram 875 can be employed by any of the UEs 111-116 of FIG. 1. This example is for illustration only and other embodiments can be used without departing from the scope of the present disclosure.

An A-IoT UE may directly communicate with a base station/gNB or may indirectly communicate with a base station/gNB through an intermediate/assisting node, such as a handheld device/UE (for example, a "Reader" UE that scans the A-IoT devices), a relay, IAB node, a repeater for example a network-controlled repeater (NCR), and so on. The communication can be mono-static wherein the transmitter node to the A-IoT UE is same as the receiving node from the A-IoT UE or can be bi-static (or multi-static) wherein the transmitter nodes to the A-IoT UE can be different from the receiving nodes from the A-IoT UE.

With reference to FIG. 8, example topologies for A-IoT are shown. FIG. 8(*a*) shows an example topology for direct communication of a gNB with an A-IoT UE/device. FIG. 8(*b*) shows an example topology for indirect communication of a gNB with an A-IoT UE/device through an intermediate node, such as a relay, repeater, and so on. FIG. 8(*c*) shows an example topology for mixed communication of a gNB with an A-IoT UE/device, wherein the gNB 102 is directly communicating with the A-IoT device on the DL, while the gNB 102 is communicating with the A-IoT device on the UL indirectly through an intermediate node, such as a relay, repeater, and so on. FIG. 8(*d*) shows an example topology for the communication of the A-IoT device with a "reader" UE for both device-terminated and device-originated communication.

An A-IoT UE may receive energy from the same nodes to/from the A-IoT UE is communicating with, or the A-IoT UE may have a separate entity/source for providing the energy (including radio/RF waveform energy or non-radio energy sources).

An A-IoT UE may operate in frequency division duplex (FDD) or time division duplex (TDD) modes, in FR1 or FR2 frequency bands, and on licensed or unlicensed spectrum.

An A-IoT UE may co-exist in 5G NR frequency band used by other nodes/UEs in the network 130 or may operate in frequency bands dedicates to A-IoT UE. An A-IoT UE may also operate in guard-bands of existing 5G NR frequency bands.

Since an A-IoT UE can harvest small amounts of energy and an energy storage unit may not be present (for Type-A A-IoT UEs) or may have very small capacity (for Type-B/C A-IoT UEs), the A-IoT UE may need to operate with ultra-low power consumption, for example, smaller than 1 mW peak power level, such as (−10) dBm or possibly down to (−30) dBm. For several use-cases, when setting up communication to an A-IoT UE, the 5G system needs to be able to handle the unavailability of A-IoT UEs either due to lack of power or due to power saving mechanisms of the A-IoT UE.

For example, [REF9, TR 22.840] evaluates the following three potential modes of operation for an A-IoT UE:

- Normal operation: power continuously or mostly available, due to continuous power harvesting or with limited energy storage (e.g. in a capacitor).
  - Processor and communications module in the A-IoT UE can be continuously active.
  - The communications module can listen to network at regular intervals to determine if there is mobile terminated traffic (e.g. trigger messages) and can transmit data when relevant.
- Device triggered operation: power available only intermittently & activation per device decision.
  - A-IoT UE can only be active for the short periods of time.
  - A-IoT UE decides when to communicate with the network 130.
  - It is possible that the A-IoT UE is not able to listen to the network 130 for mobile terminated traffic for very long periods of time.
- On demand operation: wake up/trigger the A-IoT UE per 5G network indication/signal.
  - The A-IoT UE cannot determine when to communicate.
  - Waking up of the A-IoT UE can be combined with a trigger to perform a specific action (e.g. do measurement) or to communicate (e.g. send an identifier).
  - Waking up can also imply that the A-IoT UE starts listening to the network 130 for further instructions.

Several A-IoT use-cases rely on a network (NW) trigger, such as a discovery or trigger or wake-up signal, to initiate the connection/communication. While for other A-IoT use-cases, the communication can be initiated by a device internal trigger, such as an event-based trigger. The communication can follow in a periodic manner or in an on-demand or aperiodic or event-based manner. In several use-cases, the communication/data "transfer interval" can be short, so the UE 116 may be active for a short period of time. The A-IoT UE may not need a radio connection before or after the "transfer interval" or the activity period.

For various A-IoT use-cases, a communication payload can be very small, such as tens or hundreds of bits in occasional and infrequent intervals (for example, every 15 minutes, or every hour or more). In addition, several use-cases have a relaxed latency requirement, such as an end-to-end latency of 100 ms to 10 sec or more, thereby implying a data rate of several kilo-bits per second (kbps) or less. A majority of A-IoT use-cases require device-originated/UL traffic, including a predetermined ID of the A-IoTUE and, in several use-cases, also some sensor measurement reports. Some use-cases may also involve device-terminated/DL traffic such as control commands for the A-IoT UE, for example, to enable/modify a status or operation of the A-IoT UE.

Several A-IoT use-cases rely on group communication to/from a group of A-IoT UEs, such as a number of A-IoT UEs of a same type/functionality or a number of A-IoT UEs in proximity such as in a same container or geographic location.

Some A-IoT use-cases evaluate the network 130 or a management platform collecting information about the energy harvesting status of A-IoT UEs or efficiency of the energy harvesting operation by the A-IoT UEs, such as charging per data volume/message, charging information for a large group of closely located A-IoT UEs, and so on, in an efficient way.

An A-IoT UE may operate in indoor or outdoor environments, including with macro/micro/pico cell-based deployments (the serving cell may or may not be transparent to the A-IoT UE). Several A-IoT use-cases (for example, for indoor deployment) may require a communication range of ~10-30 m (with some up to 50 m). Several other A-IoT use-cases (for example, for outdoor deployments) may require a larger communication range such as ~50-200 m.

Throughout the present disclosure, the term "configuration" or "higher layer configuration" and variations thereof (such as "configured" and so on) are used to refer to one or more of: pre-configuration such by operation and management (OAM), as a system information signaling such as by a master information block (MIB) or a system information block (SIB) (such as SIB1), a common or cell-specific information provided by dedicated higher layer/RRC signaling, or a dedicated or UE-specific or BWP-specific information provided by dedicated higher layer/RRC signaling.

Throughout the present disclosure, a UE or a device may refer to an A-IoT device or an A-IoT UE based on energy harvesting with ultra-low complexity and power consumption and for low-end IoT applications, as previously described. Various embodiments may broadly apply to any UE with an output energy/power level that is variable over time, for example, due to time-varying allocation of power/energy for the transmissions/operations, for example due to handling of RF waveform exposure for Specific Absorption Rate (SAR) or Maximum Permissible Exposure (MPE) or for coverage enhancement, or due to energy harvesting from the environment, while the UE 116 may operate with advanced capabilities or for higher-end applications or with more stringent requirements.

Energy status report (ESR) for A-IoT devices: In one embodiment, a UE can report information about its energy/power buffer level to the gNB 102. For example, ESR can provide information of instantaneous energy level of the UE, or average/maximum/accumulated energy level of a UE up to a certain time or at a certain time or within a certain time period. For example, ESR can include information about the available energy level of the UE, which may include or exclude an energy level for UE internal operations, such as for memory, sensors, and so on, or an energy level for RF operation other than transmission, such as for warm-up, activation, dissipation, usage, and so on in various circuitry such as RF circuitry, or any back-off energy level such as for regulatory requirements, interference handling, power saving policy, and so on. For example, ESR can be based on or can include information about energy harvesting efficiency, such as charging amount per time unit or charging unit per data volume or per message, or about environmental factors, energy arrival pattern or statistics, or energy harvesting circuitry dissipation, waste or leakage, and so on. For example, ESR can include a maximum available energy level for example, by excluding various wasted energies or back-off energy levels, corresponding to a certain time or a certain time period or independent of any time instance. For example, the ESR can be in part or fully based on an energy received from a continuous wave (CW) source, that can operate independently from the wireless network, or can be under full or partial control of the network/gNB.

For example, an energy level reported via ESR is a time-varying function that varies over time, for example, based on changes to the energy harvesting over time, or can have additionally or alternatively an stochastic behavior, such as a random variable or a random process, that can have different values at different time associated with a probability distribution that is fully or partially (or not at all) known by the UE or by the gNB or the Reader UE, and so on.

The energy status report (ESR) can be, for example, in terms of a small message, such as 1 or 2 bits, corresponding to 2 or 4 energy levels. The reported ESR may be with reference to the UE energy buffer before or after transmission of a channel/signal that provides the ESR. The reference time can be defined in the specifications of system operation, such as for example a PUSCH preparation time or a separately defined time or can be indicated by information provided by higher layers. Different modes of ESR may be supported as is subsequently described, such as short ESR, long ESR, and extended ESR, wherein the UE 116 can provide the UE energy buffer for one or multiple time-instances and using different number of bits. For example, ESR can correspond to information about future time instances that can provide, e.g., information about future prediction of energy availability/harvesting or energy consumption/usage. For example, the UE can estimate a value of available energy at a certain future time (or a number of time instances in future) and reports the estimated value along with the corresponding time instance information.

ESR can be also referred to as energy buffer status report (EBSR) or as energy state information (ESI) report.

An ESR can be applicable at least for UEs with variable output power, or variable input power or variable available power, or variable average/maximum energy or power level such as A-IoT devices having output power that can change over time based on ambient energy harvesting/storage. For example, an ESR can be beneficial at least for UEs with a battery or an energy storage unit, such as A-IoT UEs of Type-B or Type-C UEs (or Type-I or Type-II UEs) with a small capacitor, as previously described.

A UE can provide an ESR to enable a serving gNB to evaluate an available energy by the UE 116 when scheduling transmissions from the UE 116 and adapt such scheduling to the UE energy buffer. For example, the gNB 102 can schedule the UE 116 for a PUSCH transmission or a PDSCH reception in slots where the gNB 102 assumes the UE 116 to have sufficient energy levels based on preceding ESRs from the UE 116. Therefore, the gNB 102 can reduce occasions when a PUSCH transmission or a PDSCH reception from the UE 116 includes slots where the UE 116 does not have sufficient energy for the PUSCH transmission or PDSCH reception. Also, the gNB 102 can learn the statistics of the energy harvesting (EH) or energy storage random process of the UE 116, for example using artificial intelligence or machine learning (AI/ML) methods, to improve scheduling for the UE 116 according to a EH pattern. In another example, the gNB can indicate to an internal or external source of CW to increase the CW transmission to the UE, such as transmission of CW with higher power, or with longer durations, and so on.

An energy buffer level in an ESR can correspond, for example, to a level of the UE 116 energy buffer after the UE 116 has completed transmission of a channel/signal providing the ESR. For example, when the UE 116 has a power/energy level $E_1$, and consumes a power/energy level $E_2 \leq E_1$ for transmission of a PUCCH or PUSCH that includes the ESR (or for any other purposes for A-IoT operation before ESR transmission), a power/energy level in an ESR can be based on $E_1$-$E_2$. In another example, the UE 116 reports ESR based on a UE power/energy level at a time immediately prior to a transmission of a PUSCH or PUCCH that includes the ESR, such as at a time corresponding to $T_{proc,2}$ symbols, as defined in [REF4, TS 38.214], or a fraction or variations thereof, before a first symbol of the PUSCH or PUCCH transmission and then a power/energy level reported in an ESR can be based on $E_1$.

FIG. 9A, FIG. 9B, FIG. 9C, and FIG. 9D illustrate diagrams for ESR formats 900, 925, 950, and 975, respectively, according to embodiments of the present disclosure. For example, diagram 900, diagram 925, diagram 950, and diagram 975 can be implemented by the UE 116 of FIG. 3.

An ESR can comprise of N bits to indicate one of $2^N$ different levels or ranges for the UE energy buffer. The $2^N$ levels or ranges for UE energy buffer can be predetermined in the specifications for system operation or can be provided to the UE 116 by higher layers. In one example, N=1 or 2 bits and the ESR can indicate one of 2 or 4 different energy levels, respectively. An additional level corresponding to insufficient energy can be provided, at least when the UE 116 is triggered (by the gNB 102 or "Reader" UE) to provide an ESR, by the UE 116 not transmitting a corresponding signal/channel. In another example, ESR can include a larger bit-width such as 6 to 8 bits and be provided for example by a MAC CE in a PUSCH (as in the examples herein for PHR re-interpretation or modification).

In one example, different types of ESR may be supported (for example, by a MAC CE), such as short ESR and long ESR, wherein short ESR can include 1 or 2 bits, and long ESR can include 6 to 8 bits.

In one example, an extended ESR may refer to an ESR wherein the UE 116 reports multiple values for the UE energy buffer corresponding to multiple time instances. For example, the UE 116 may estimate an ESR in a time instance from the multiple time instances based on current power harvesting or based on current statistics for power harvesting. For example, the IE may estimate an ESR in a time instance from the multiple time instances based on transmissions/receptions from the UE 116 prior to and including the time instance. For example, the ESR can include energy information corresponding to past time instances, per gNB indication or per UE determination and reporting, or per events that are internal or external to the UE. For example, the gNB can indicate information of one or multiple time instances in future, such as a number of symbols or slots or a certain time offset after a PDSCH or a DL network trigger or other DL indication that triggers an ESR, and the UE is informed to determine the corresponding energy level corresponding to the one or multiple time instances, and then transmit the corresponding ESR in an uplink channel such as a PUSCH that is after the one or multiple time instances (by at least a second offset time such as a PUSCH processing time or a configured/indicated offset) or in an indicted reporting time instance. For example, the UE 116 can report 4 ESR values corresponding to 4 different slots or frames. For example, the multiple ESR values can be provided using indexes for separate absolute values or using a first index for a first absolute value (corresponding to a first time-instance/ slot/frame) and a number of indexes (corresponding to the remaining time instances/slots/frames) with fewer bit-widths as differential ESR values that are relative to the first ESR value. For example, the time instances can be provided using explicit indexes for the corresponding time slots or frames.

For example, the UE 116 determines whether to transmit a channel/signal, such as a PUSCH, with a short ESR or a long ESR or an extended ESR based on:

(pre)configuration by higher layers, or

L1/L2 indication such as by a wake-up signal, or by a scheduling DCI format, or by other network trigger or indication such as by a non-scheduling DCI format, or UE determination such as whether a remaining energy buffer level of the UE 116 is smaller or larger than a threshold, wherein the threshold can be defined in the specifications or provided by higher layers.

The methods herein for ESR trigger are further described in one or more examples herein.

For example, the ESR can include a field, such as with 1 or 2 bits, that indicates whether the UE 116 is reporting a short ESR or a long ESR or an extended ESR, which then determines a number or size of the fields/values provided by the ESR.

With reference to FIG. 9, several example formats for ESR are shown. FIG. 9A shows an example format for short ESR with 2 bits. FIG. 9B shows an example format for long ESR with 6 bits. FIG. 9C shows an example format for extended ESR with N values for short ESR (with 2 bits) corresponding to N time instances. FIG. 9D shows an example format for extended ESR with N values for long ESR (with 6 bits) corresponding to N time instances. In one example, a single format for ESR can be evaluated (with one or multiple additional auxiliary fields) to unify the different ESR formats. For example, a first auxiliary field to indicate a size of ESR field(s), e.g., 2 or 6 bits; a second auxiliary field to indicate a number of time instance(s), such as one or up to 4 time instances. Then, the UE 116 can determine the size/field(s) in the ESR format accordingly. In one example, some or all energy values are associated with one or multiple predetermined or indicated time instances, and the UE provides the corresponding one or multiple energy values sequentially in a same order, such as ascending order or descending order, of the predetermined or indicated time instances, without explicitly indicating the corresponding time instances.

In one example, the UE 116 can apply compression to the ESR report. For example, the compression can be applicable when the UE 116 reports ESR for multiple time instances, such as for the extended ESR as described herein. For example, the UE 116 can be provided a codebook for transmission of the multiple ESR values with fewer bits for each or for transmission of a single value that jointly encodes the multiple ESR values. Such compression can be similar to CSI compression methods, such as Type-I or Type-II codebooks for CSI feedback as described in [REF4, TS38.214].

Figure 10:
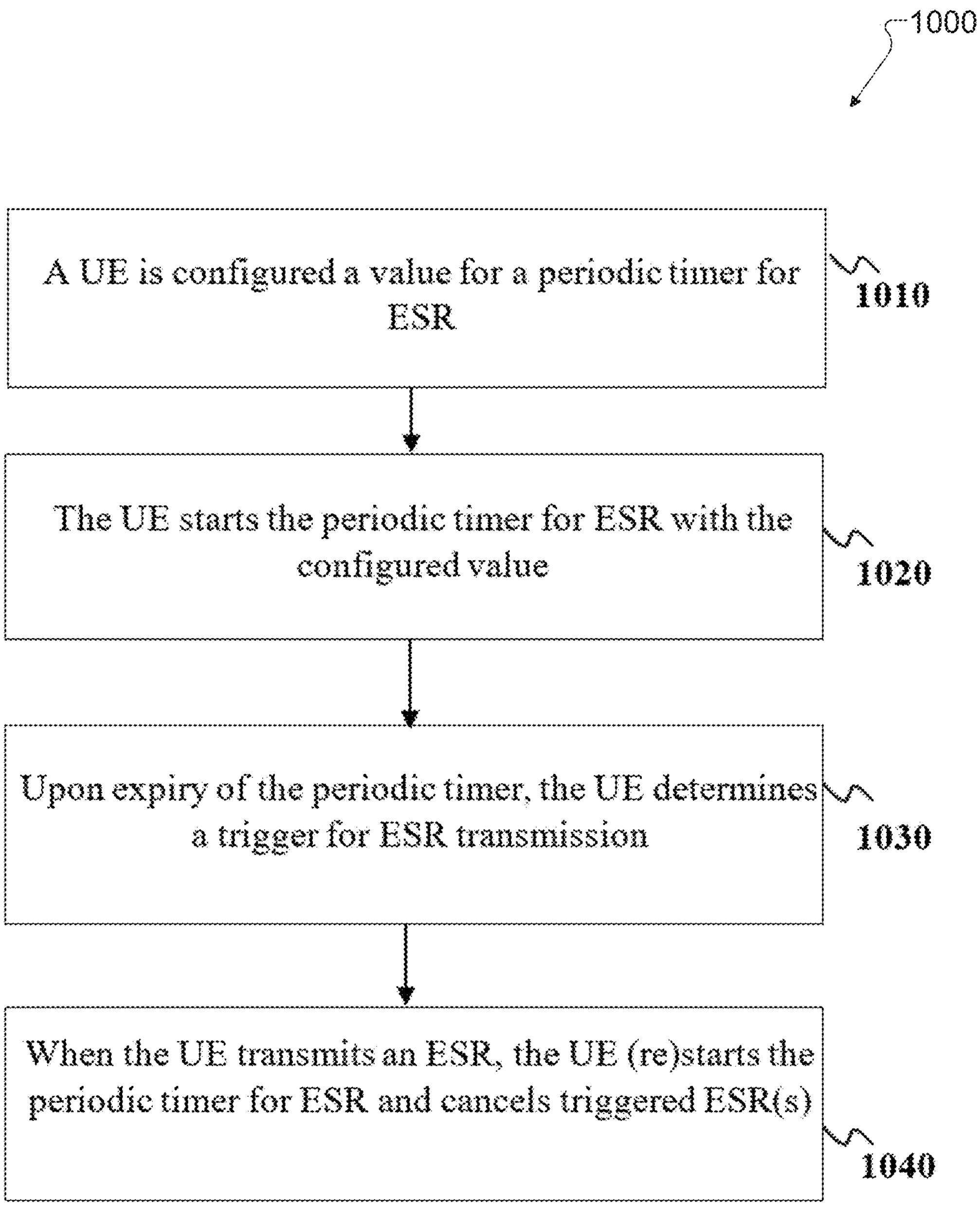
FIG. 10 illustrates a flowchart of an example UE procedure for operating a periodic timer for ESR trigger according to embodiments of the present disclosure.

FIG. 10 illustrates a flowchart of an example UE procedure 1000 for operating a periodic timer for ESR trigger according to embodiments of the present disclosure. For example, procedure 1000 for operating periodic timer for ESR trigger can be followed by the UE 111 of FIG. 1. This example is for illustration only and other embodiments can be used without departing from the scope of the present disclosure.

The procedure begins in 1010, a UE is configured a value for a periodic timer for ESR. In 1020, the UE 116 starts the periodic timer for ESR with the configured value. In 1030, upon expiry of the periodic timer, the UE 116 determines a trigger for ESR transmission. In 1040, when the UE 116 transmits an ESR, the UE 116 (*re*)starts the periodic timer for ESR and cancels (all) triggered ESR(s).

In one embodiment, a UE can be triggered to report ESR or the UE 116 can report ESR periodically based on a periodic timer or a periodic (configured by RRC) or semi-persistent (activated/de-activated by a MAC CE) configuration providing a resource for transmission of an associated signal/channel, a time periodicity, and a time offset. For periodic ESR reports, it is also possible that a UE provides an ESR report based on or a UE decision, for example when the energy status changes relative to an energy status provided in a previous ESR by an amount that can be defined in the specifications of the system operation or provided to the UE 116 by a serving gNB by information from higher layers. A determination for an energy status or a determination to report ESR can be based on UE measurements or changes in UE operation mode/state.

Alternatively, an indication from gNB, such as by dedicated signaling or via a common signaling, can trigger an ESR. the UE 116 can transmit a triggered ESR when the UE 116 is provided UL resources. A UE experiencing energy shortage may choose not to transmit an ESR, even when provided with UL resources, or is triggered, to do so. For example, a trigger for ESR can be based on a change in the energy harvesting efficiency of the UE, such as a harvesting/charging level in a certain time period or per unit time or per data volume or message less than a certain threshold, or changes to in UE conditions or environmental conditions that impact the energy harvesting procedure or a corresponding efficiency.

In one example, ESR can be triggered based on external event, such as events that the UE determine by measurements of the surrounding environment, for example, based on UE sensor, or by triggers from UE higher layers such as application layer. For example, ESR can be triggered based on L1/L2/L3 measurements, such as RSRP, RSRQ, SNR, SINR, with or without filtering such as L3-filtering. For example, a DL channel such as a PDSCH can provide a trigger for ESR. For example, the trigger can be based on a wake-up/discovery/inventory indication such as LP-WUS. For example, the UE can provide an ESR in a first uplink transmission such as PUSCH or PRACH that is in response to the reception of the NW trigger such as wake-up/discovery/inventory indication. For example, such NW trigger can include an information element that indicates a trigger for the ESR, or providing ESR (possibly along with other information, such as PRACH preamble, random sequence, UE ID, and so on) in response to the NW trigger can be a default UE behavior that is predetermined in the specifications of the system operations.

In an example for periodic ESR, a UE can be indicated/configured a first timer, such as esr-Periodic Timer, to provide ESR. For example, the UE 116 (re-)starts the esr-Periodic Timer when the UE 116 provides an ESR and the UE 116 is triggered for a next ESR transmission or the UE 116 transmits a next ESR when esr-PeriodicTimer expires. In one example, expiry of esr-Periodic Timer [only] determines a trigger for ESR and the UE 116 can provide an ESR upon esr-Periodic Timer expiry when other conditions are met, such as when the UE 116 has UL resources available to transmit a signal/channel providing the ESR or when the UE 116 has sufficient energy (as subsequently described). In another example, the UE 116 provides an ESR upon expiry of esr-Periodic Timer without any other conditions. For example, the UE 116 expects to be/have been provided UL resources for ESR transmission upon expiry of esr-PeriodicTimer.

For example, the UE 116 can also be provided a second timer, such as esr-ProhibitTimer, to avoid frequent ESR transmission. For example, the UE 116 (re-)starts the esr-ProhibitTimer when the UE 116 provides an ESR, and the UE 116 does not determine a new ESR trigger or does not provide a next ESR while esr-ProhibitTimer is still running, that is, when a time duration elapsed since the last ESR transmission is less than a threshold/value configured by the esr-ProhibitTimer.

In one example, the first and second timers (esr-PeriodicTimer and esr-ProhibitTimer) can be separately provided and operated. For example, the UE 116 can receive an ESR trigger or provide an ESR due to expiry of esr-PeriodicTimer even though esr-ProhibitTimer is running. For example, esr-ProhibitTimer may be applicable to triggers for ESR other than a trigger for ESR due to expiry of esr-Periodic Timer.

In another example, a configuration or operation of the first and second timers (esr-Periodic Timer and esr-ProhibitTimer) can be related. For example, the UE 116 does not expect to be provided a value for esr-ProhibitTimer that is larger than a value configured for esr-Periodic Timer. For example, the UE 116 may not/does not receive an ESR trigger or provide an ESR due to expiry of esr-PeriodicTimer while esr-ProhibitTimer is running (similar to other triggers for ESR).

For example, a UE can be provided a periodicity and an offset for a transmission of a signal/channel providing ESR, wherein the periodicity and offset can be in terms of slots or symbols or in an absolute time unit such as milliseconds. For example, the UE 116 can be configured UL resources, such as CG PUSCH Type-1 or Type-2 or periodic or semi-persistent PUCCH (P/SP PUCCH), to provide ESR. For example, the UE 116 can be provided an indication whether or not ESR reporting is enabled for a PUCCH or PUSCH configuration, such as by an information element (IE) in the higher layer configuration of the P/SP PUCCH or CG PUSCH (Type-1 or Type-2), or a field in a MAC-CE for activation of the semi-persistent ESR reporting on PUCCH, or a field in a DCI format that activates the CG PUSCH Type-2. In another example, such "enabling" or "disabling" a PUCCH or PUSCH for providing ESR can also apply to aperiodic PUCCH or a PUSCH scheduled by a DCI format, wherein an IE in the PUCCH or PUSCH configuration or an indication in the DCI format can provide the information for such "enabling" or "disabling". In the examples herein, such "enabling" or "disabling" can be per UE or per a group of UEs.

In a second realization, the UE 116 determines triggers for ESR or provides an ESR based on a determination of certain events, such as based on a UE energy buffer level or based on changes in UE operation state/mode.

For example, the UE 116 determines a trigger for ESR or the UE 116 provides an ESR when any of the following events occur:

- a value of the UE 116 energy buffer has changed (increased or decreased) more than a first threshold since a last transmission of ESR; or
- a value of the UE 116 energy buffer is above a second threshold; or
- a value of the UE 116 energy buffer is below a third threshold.

For example, "a value of the UE 116 energy buffer" in the events herein may refer to a value of the UE 116 energy buffer when determining the trigger, or a value of the UE 116 energy buffer when providing the ESR (e.g., when UL resources are available for transmission of the ESR), or a value of the UE 116 energy buffer after the UE 116 has provided the ESR. For example, the first or second or third thresholds can be predetermined in the specifications for system operation or can be (pre)configured by higher layers.

In one example, one or more of the events herein can be modified so that they are applicable jointly with operation of a timer such as the esr-ProhibitTimer. For example, the UE 116 determines a trigger for ESR or the UE 116 provides an ESR when any of the following events occur:

- esr-ProhibitTimer expires or has expired, and a value of the UE 116 energy buffer has changed (increased or decreased) more than a first threshold since a last transmission of ESR, or
- esr-ProhibitTimer expires or has expired, and a value of the UE 116 energy buffer is above a second threshold, or
- esr-ProhibitTimer expires or has expired, and a value of the UE 116 energy buffer is below a third threshold.

Figure 11:
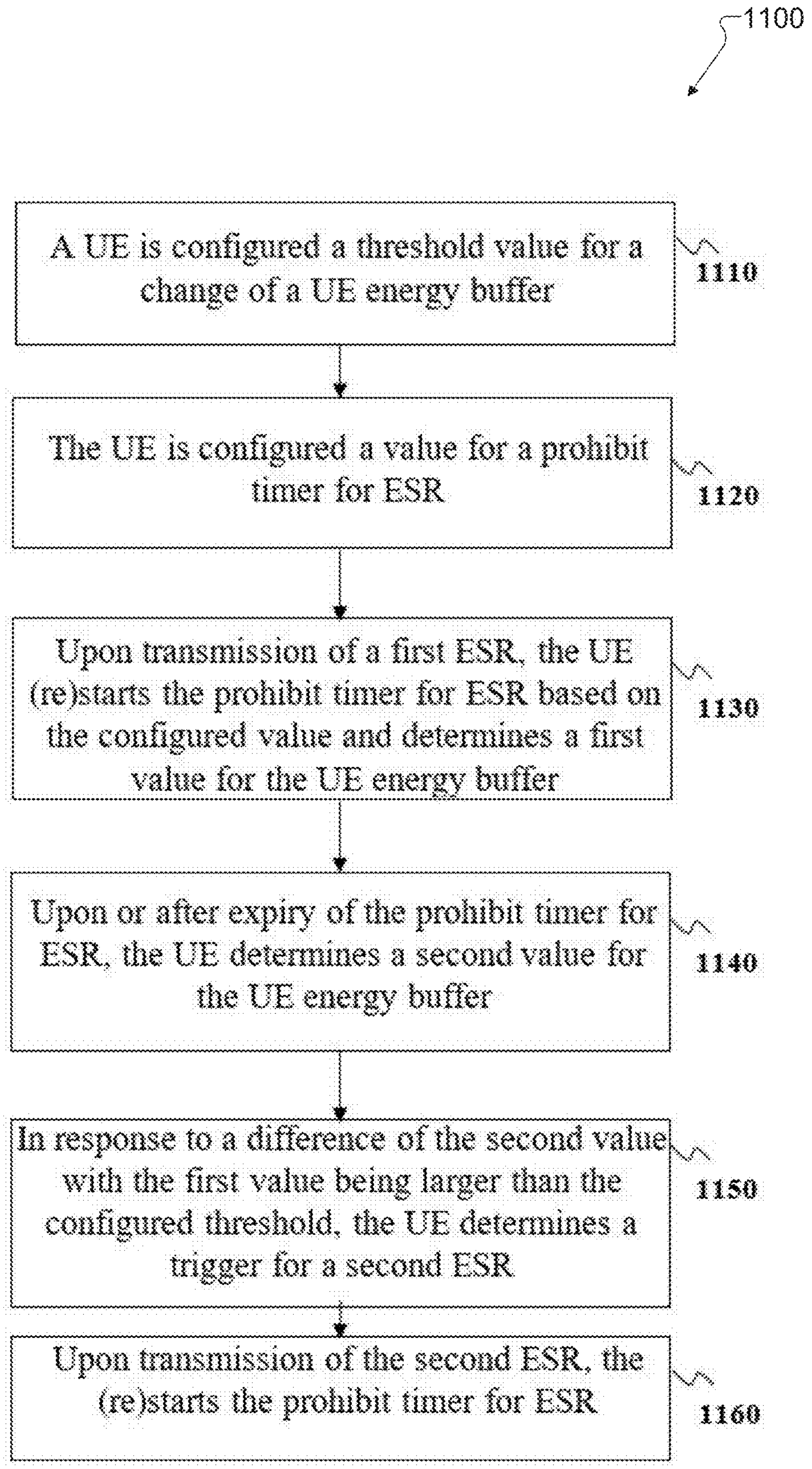
FIG. 11 illustrates a flowchart of an example UE procedure for operating a prohibit timer according to embodiments of the present disclosure.

FIG. 11 illustrates a flowchart of an example UE procedure 1100 for operating a prohibit timer according to embodiments of the present disclosure. For example, procedure 1100 for operating a prohibit timer can be performed by the UE 113 of FIG. 1. This example is for illustration only and other embodiments can be used without departing from the scope of the present disclosure.

The procedure begins in 1110, a UE is configured a threshold for a change of a UE energy buffer. In 1120, the UE 116 is configured a value for a prohibit timer for ESR. In 1130, upon transmission of a first ESR, the UE 116 (*re*)starts the prohibit timer for ESR based on the configured value and determines a first value for the UE energy buffer. In 1140, upon or after expiry of the prohibit timer for ESR, the UE 116 determines a second value for the UE energy buffer. The determination of the second value can also be based on the UE 116 having UL resources and energy available for ESR reporting. In 1150, in response to a difference of the second value with the first value being larger than the configured threshold, the UE 116 determines a trigger for a second ESR. In 1160, upon transmission of the second ESR, the (re)starts the prohibit timer for ESR.

In one example, one or more of the events herein can be modified so that they are applicable jointly with other conditions for a UE to provide ESR, such as resource/energy availability. For example, the UE 116 determines a trigger for ESR or the UE 116 provides an ESR when any of the following events occur:

- a value of the UE energy buffer has changed (increased or decreased) more than a first threshold since a last transmission of ESR when the UE 116 has UL resource or energy available for ESR transmission, or
- a value of the UE energy buffer is above a second threshold when the UE 116 has UL resource or energy available for ESR transmission, or
- a value of the UE energy buffer is below a third threshold when the UE 116 has UL resource or energy available for ESR transmission.

In one example, both timer operation and resource/energy availability conditions may be combined with the ESR trigger events. For example, the UE 116 determines a trigger for ESR or the UE 116 provides an ESR when:

- esr-ProhibitTimer expires or has expired and a value of the UE energy buffer has changed (increased or decreased) more than a first threshold since a last reporting of ESR when the UE 116 has UL resource or energy available for ESR transmission.

For example, a UE can determine an ESR trigger or the UE 116 can provide an ESR when the UE 116 determines other conditions/events, for example, based on the UE 116 operation, such as when:

the UE 116 changes (or adds) a serving cell; or the UE 116 establishes an RRC connection (from RRC_IDLE mode or due to mobility) or when the UE 116 resumes an RRC connection from RRC_INACTIVE state; or the UE 116 (*re*)starts an ON/Active period in a discontinuous reception (DRX) cycle, such as idle-mode DRX (iDRX) or connected-mode DRX (c-DRX); or esr-ProhibitTimer expires or has expired and the path loss (or an RSRP) has changed more than esr-Tx-PowerFactorChange dB for at least one RS used as pathloss reference for one activated Serving Cell of any MAC entity of which the active DL BWP is not dormant BWP since the last transmission of a ESR in this MAC entity when the MAC entity has UL resources for new transmission.

In a third realization, the UE 116 can receive a trigger for ESR transmission or can provide the ESR based on explicit or implicit indication by the network 130 that can be by UE-specific, such as by a DCI received in a PDCCH according to a USS set, or by group-common signaling such as by a DCI received in a PDCCH according to a CSS set, for example, in a Type-3 CSS set. For example, the UE 116 receives the DCI format with a cyclic redundancy check (CRC) that is scrambled with cell-radio network temporary identifier (C-RNTI). In another example, the DCI format includes a CRC that is scrambled with a new RNTI, such as ambient-radio network temporary identifier (A-RNTI) or ESR-RNTI. For example, the new RNTI can be dedicated to the UE 116, such as A-IoT UE, or provided for a number of UEs, such as a group of A-IoT UEs. For example, the information of the new RNTI can be provided by dedicated RRC information or can be provided by common RRC configuration or as common RRC information provided by dedicated signaling. For example, the trigger can be L1 information that is provided in a PDSCH. For example, the UE may not support PDCCH monitoring.

For example, the UE 116 can determine a trigger for ESR implicitly upon receiving a signaling for UE operation, such as for UE wake-up or scheduling, for example, when:

the UE 116 receives a discovery signal or wake-up signal (WUS), such as a low-power wake-up signal (LP-WUS) or a DL channel such as a PDSCH that triggers an ESR such as an ESR trigger MAC-CE provided by the PDSCH, or the UE 116 receives an DCI format scheduling a PUSCH transmission or a PDCCH order that triggers an inventory/random access procedure, or the UE 116 is provided periodic or semi-persistent UL resources, as described herein.

For example, determining the ESR trigger or reporting of the ESR is based on the reception of the one or more signaling methods described herein, without any explicit/new field or parameter for such indication, or without any repurposing or re-interpreting the fields or parameters in the signaling methods herein. For example, such default determination of a trigger for ESR upon reception of the signaling methods herein applies to at least a certain class of UEs, such as A-IoT UEs.

In one example, when a UE is (pre)configured for small data transmission (SDT) in RRC_INACTIVE state, for example by configuration of PUSCH resources associated with PRACH or by a CG PUSCH configuration, the UE 116 can be provided an information element (IE) within the SDT configuration or within the PUSCH configurations for SDT that indicates whether the corresponding configuration can be regarded as ESR trigger or can be used for ESR reporting. For example, when the IE indicates ESR reporting to be "enabled" on the SDT PUSCH resources, the UE 116 can transmit an ESR in any/all such PUSCH resources. In another example, the UE 116 can be provided a separate configuration or IE, within the SDT configuration or within the PUSCH configurations for SDT, to indicate which SDT PUSCH resources/occasions can be used for ESR reporting. In another example, the UE 116 determines an ESR trigger, or the UE 116 can provide ESR in such PUSCH resource without any additional signaling or indication.

For example, the UE 116 receives/determines a trigger for ESR, or the UE 116 provides the ESR based on explicit indication or signaling. For example, the indication can be provided by re-interpreting a field/parameter in an existing signaling or by a new field in an existing signaling. Herein, an existing signaling may refer to any L1/L2 signaling, or a higher layer configuration supported in, for example, [REF2, TS 38.212, v17.4.0] or [REF6, TS 38.321, v17.3.0] or [REF7, TS 38.331, v17.3.0] and so on.

Figure 12:
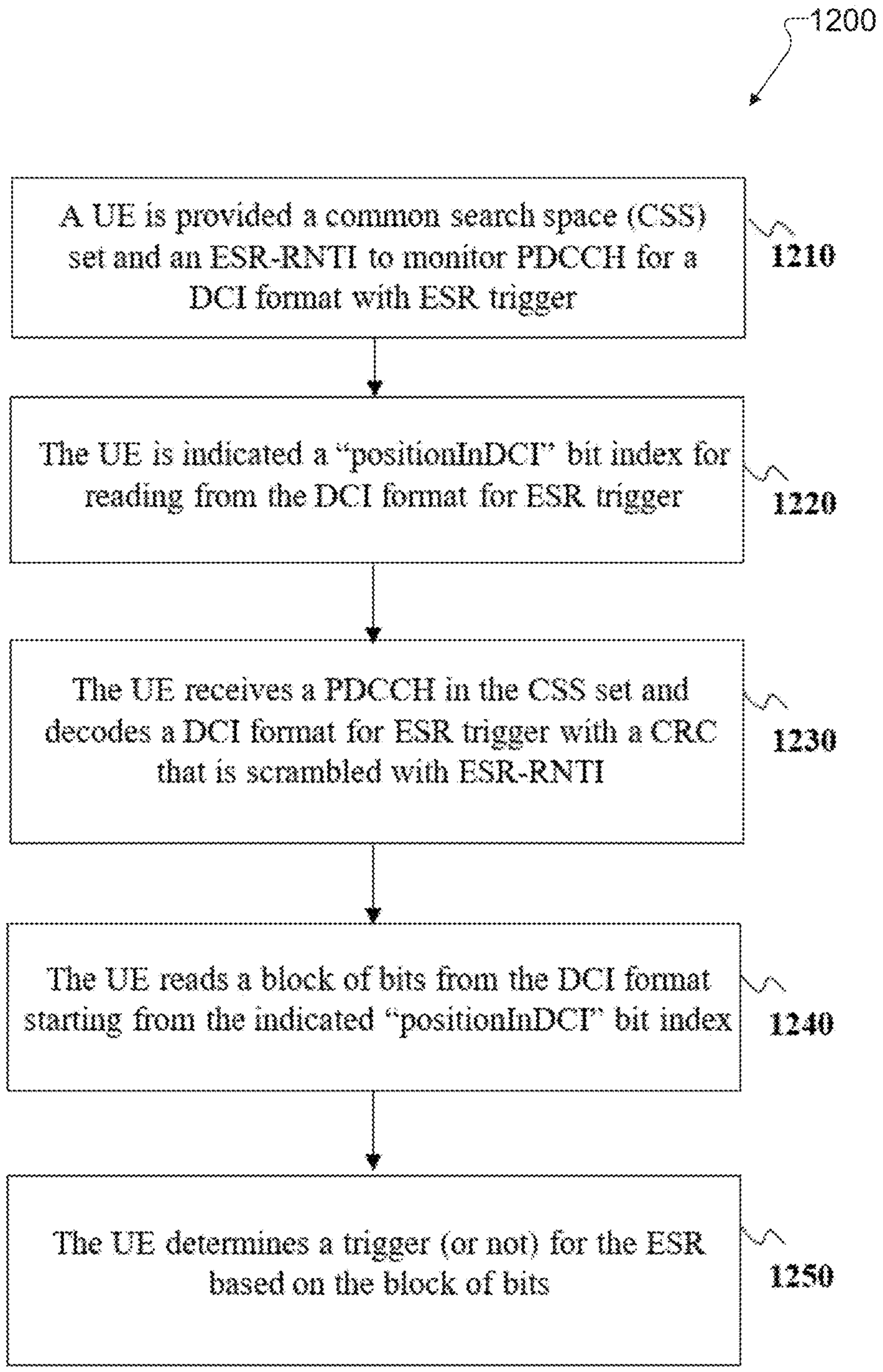
FIG. 12 illustrates a flowchart of an example UE procedure for determining an ESR trigger according to embodiments of the present disclosure.

FIG. 12 illustrates a flowchart of an example UE procedure 1200 for determining an ESR trigger according to embodiments of the present disclosure. For example, procedure 1200 for determining an ESR trigger can be followed by the UE 112 of FIG. 1. This example is for illustration only and other embodiments can be used without departing from the scope of the present disclosure.

The procedure begins in 1210, a UE is provided a common search space (CSS) set and an ESR-RNTI for monitoring PDCCH for detection of a DCI format with ESR trigger. In 1220 the UE 116 is indicated a "positionInDCI" bit index for reading from the DCI format for ESR trigger. In 1230, the UE 116 receives a PDCCH in the CSS set and decodes a DCI format for ESR trigger with a CRC that is scrambled with ESR-RNTI. In 1240, the UE 116 reads a block of bits from the DCI format starting from the indicated "positionInDCI" bit index. In 1250, the UE 116 determines a trigger (or not) for the ESR based on the block of bits.

In one example, one or more of:

an LP-WUS, or a DCI format 2_6 for wake-up indication, or a DCI format used for scheduling of a PUSCH or triggering a PUCCH transmission or for activation of a CG PUSCH Type-2, or a DCI format that is validated for dormancy indication as described in [REF3, TS 38.213, v17.4.0, or a DCI format used for multicast-broadcast services (MBS) scheduling (e.g., to trigger ESR for multiple UEs), or a MAC-CE for activation of semi-persistent CSI reporting on PUCCH or on PUSCH can include a new field to indicate a trigger for ESR. For example, the new field may be referred to as an "ESR trigger field" with 1 bit, wherein a value '0' for the field indicates no ESR triggered, and a value '1' for the field indicates that ESR is triggered.

In one example, when a DCI scheduling a PUSCH transmission or a PDSCH reception provides the ESR trigger, the UE 116 provides the ESR in a PUSCH or in a PUCCH that is scheduled/triggered by the DCI. For example, the UE 116 may only provide the ESR without UL-SCH in a PUSCH or the UE 116 may multiplex ESR (as a form of UCI) along with a transport block in the PUSCH.

In another example, a field in any of the example signaling methods herein can be repurposed or re-interpreted to provide an indication for ESR trigger. For example, one MSB (or least significant bit (LSB)) of an MCS field in a DCI format scheduling a PUSCH transmission or a PDSCH reception, such as a DCI format 0_0/1_0 respectively, can be re-interpreted as an ESR trigger. For example, a value '0' for the MSB of the MCS field indicates no ESR trigger and a value '1' indicates ESR is triggered. Other fields or other signaling may be re-purposed for ESR trigger indication in a similar manner. Accordingly, the UE 116 determines a value of MCS for the PUSCH transmission or PDSCH reception based on the remining 4 LSBs of the MCS field in the DCI format with MSB as '0', for example, based on the first 16 rows of a corresponding MCS table.

For example, when the UE 116 monitors PDCCH for detection of the new DCI format for ESR trigger according to a CSS set, for example for providing an ESR trigger to multiple UEs with a same DCI, the UE 116 can be indicated a value for a parameter positionInDCI. The UE 116 only reads the contents of the new DCI format starting from the bit index provided by positionInDCI and for a number of bits that is predetermined in the specifications of the system operation or provided to the UE 116 via higher layers. For example, the number of bits can be based on the information related to triggering an ESR, such as one or more of:

- a trigger indication with 1 bit, with a value '0' for no trigger and a value '1' for ESR trigger;
- a resource indication for ESR transmission, such as a time/frequency resource for example based on time domain resource assignment (TDRA) and frequency domain resource assignment (FDRA) fields as in a DL/UL scheduling DCI format, or index of a time/frequency (T/F) resource from a (pre)configured list of T/F resources, or an index of a CG PUSCH configuration, or an index of a common or UE-specific PUCCH resource; and/or
- an MCS.

It is also possible that the DCI includes only a trigger, and the UE 116 determines other parameters, such as time/frequency resources or MCS, based on a previous indication by higher layers. It is also possible that a set of time/frequency resources is provided to a UE by common or UE-specific RRC information and the UE 116 determines time/frequency resources from the set of time frequency resources based on a number of triggers with value '1' that are prior to the trigger for the UE 116 in the DCI format. That approach can avoid fragmentation of time/frequency resources. For example, when the UE 116 is provided a set of time/frequency resources that includes eight individual time/frequency resources and the DCI format has four trigger fields with value '1' prior to the location of the trigger field for the UE 116 (that also has value '1'), the UE 116 determines that the first four individual time/frequency resources are used for ESR reports by other UEs and the UE 116 uses the fifth individual time/frequency resource from the set of time/frequency resources. For example, if a UE receives a DCI format with eight trigger fields or a single trigger field with eight values, with respective values being "1, 0, 0, 1, 1, 0, 1 0", and the UE 116 is configured the fifth field/location for its trigger to provide ESR, the UE 116 determines third time/frequency resources from the set of time/frequency resources. Therefore, the UE 116 can determine an index of an individual time/frequency resource from the set of time frequency resources to be the one with index that is larger by one than a sum of trigger fields with value '1' prior to the trigger field for the UE 116 in the DCI format. The same applies if instead of a DCI format, a sequence is used to trigger an ESR report from a UE where the sequence is in a set of sequences and has an index. Then, the UE 116 can determine a time/frequency resource, from the set of time/frequency resources, with index equal to the sequence index.

When the DCI format includes a field to indicate time/frequency resources for a PUSCH with ESR, a size of the field can be predetermined in the specifications, such as 10 bits (e.g., 6 bits for FDRA and 4 bits for TDRA), or can be provided by higher layer configuration. For example, the size of the resource indication field can be based on the largest number of bits needed for T/F resource indication among the multiple UEs sharing the new DCI format for ESR trigger.

When the trigger indication field provides a value '0' (i.e., no trigger), the resource indication field can have a reserved value or a value that the UE 116 discards.

For example, a CRC for the new DCI format is scrambled with a new RNTI configured to the UE 116, such as ESR-RNTI. For example, the new RNTI can be commonly configured, for example by common RRC information or in a SIB.

For example, a payload size of the new DCI format can be provided by higher layer configuration and no more than a predetermined size, such as no more than 128 bits. For example, a size of the new DCI format may be determined by the UE 116 to be same as a size of a certain DCI format scheduling a PDSCH reception or a PUSCH transmission, such as a DCI format 0_0/1_0 that the UE 116 monitors PDCCH according to a CSS set. For example, when a size of the new DCI format is smaller than a predetermined size, zeros shall be appended to the payload of the new DCI format until its size is same as the predetermined size.

For example, a trigger for ESR can be based on a MAC-CE command. For example, the UE 116 receives the MAC-CE command and provides the ESR in an UL resource, such as a semi-persistent on PUCCH or semi-persistent on PUSCH, until the UE 116 receives a deactivation MAC-CE for ESR reports. For example, the MAC-CE command can include information for the UL resource. For example, the MAC-CE can include 0 bits (or 1 bit to indicate one of activation or deactivation). The UE 116 starts/stops the ESR reporting upon reception of the MAC-CE command, for example, using UL resources previously provided for ESR reporting.

In one example, the UE 116 can provide the ESR when UL resources are allocated for the UE 116 and a number of padding bits is equal to or larger than the size of the ESR (plus any associated signaling overhead, such as an ESR sub-header). In such case, the ESR may be referred as "padding ESR".

In one example, when a UE transmits an ESR, the UE 116 cancels all triggered ESRs, and restarts timers or counters associated with ESR transmission.

Figure 13:
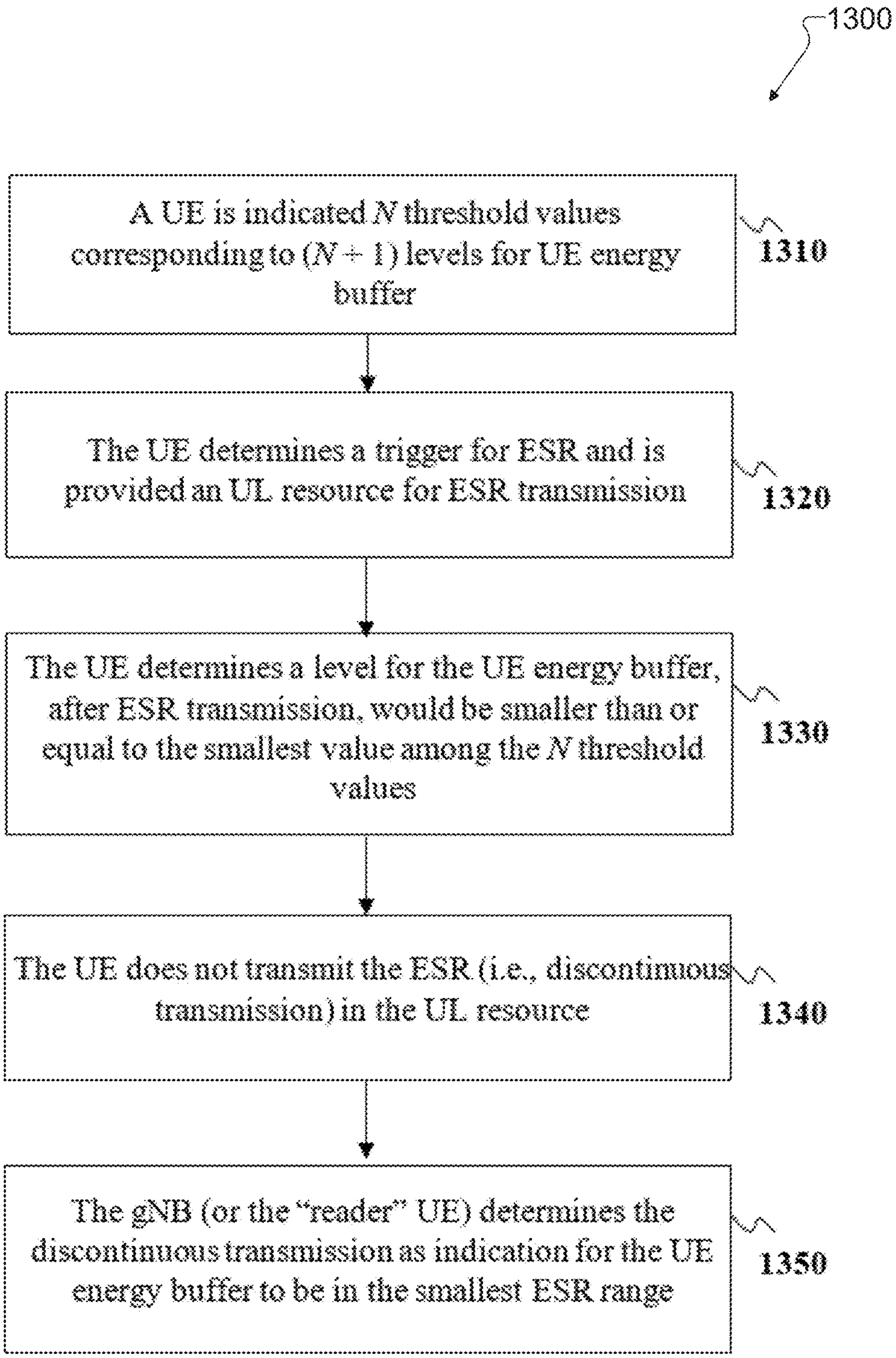
FIG. 13 illustrates a flowchart of an example UE procedure for no ESR transmission according to embodiments of the present disclosure.

FIG. 13 illustrates a flowchart of an example UE procedure 1300 for no ESR transmission according to embodiments of the present disclosure. For example, procedure 1300 for no ESR transmission can be followed by the UE 115 of FIG. 1 and a complementary process may be performed by a BS, such as BS 102. This example is for illustration only and other embodiments can be used without departing from the scope of the present disclosure.

The procedure begins in 1310, a UE is indicated N threshold values corresponding to (N+1) levels for UE energy buffer. In 1320, the UE 116 determines a trigger for ESR and is provided an UL resource for ESR transmission. In 1330, the UE 116 determines a level for the UE 116 energy buffer, after ESR transmission, would be smaller than or equal to the smallest value among the N threshold values. In 1340, the UE 116 does not transmit the ESR (i.e., discontinuous transmission) in the UL resource. In 1350, the gNB 102 (or the "reader" UE) determines the discontinuous transmission as indication for the UE 116 energy buffer to be in the smallest ESR range.

In one example, a UE triggered for ESR reporting can determine to not provide the ESR, for example, when the UE 116 determines that the UE 116 does not have sufficient energy to transmit a signal/channel with the ESR, for example based on a required transmission power the UE 116 determines based on a power control formula and on the duration of the signal/channel transmission, or due to a UE power saving policy.

For example, the UE 116 can determine such energy shortage when a level of the UE energy buffer is lower than a first threshold, such as a smallest threshold that is predetermined or (pre)configured for ESR indication. For example, when the UE 116 is provided N energy thresholds to indicate (N+1) energy ranges, and an energy buffer level of UE is smaller than or equal to the smallest threshold among the N energy thresholds, the UE 116 can determine to not provide the ESR.

For example, the UE 116 can determine an energy shortage when a level of the UE energy buffer would become smaller than or equal to a second threshold, such as the smallest threshold among the N predetermined or (pre) configured energy thresholds, after/if the UE 116 would transmit a signal/channel with the ESR. For example, the UE energy buffer level is equal to E and the UE 116 would need to consume an amount of energy equal to $E_{ESR}$ to transmit a signal/channel with the ESR, such that (E-$E_{ESR}$) would be smaller than or equal to a smallest threshold among the N predetermined or (pre)configured energy thresholds for ESR reporting. In such case, the UE 116 can determine to not provide the ESR.

For example, the UE 116 can determine an energy shortage when a level of UE energy buffer, after storing a certain energy level due to the UE 116 power policy, becomes smaller than or equal to a third threshold, such a smallest threshold among the N predetermined or (pre)configured energy thresholds. For example, the UE energy buffer level is equal to E and the UE 116 stores an amount of energy equal to S in its energy storage unit, such that (E-S) is smaller than or equal to the smallest threshold among the N predetermined or (pre)configured energy thresholds for ESR reporting. In such case, the UE 116 can determine to not transmit the ESR.

For example, the power saving condition can be combined with the condition in the previous example for potential energy consumption for a signal/channel transmission with an ESR report. For example, the UE 116 can determine such energy shortage when a level of the UE energy buffer, after storing a certain energy level due to the UE 116 power policy would become smaller than or equal to a certain threshold if/after the UE 116 would transmit the ESR. For example, the UE 116 energy buffer level is equal to E and the UE 116 stores an amount of energy equal to Sin its energy storage unit. The UE 116 would need to consume an amount of energy equal to $E_{ESR}$ if the UE 116 would provide the ESR, such that (E-S-$E_{ESR}$) would be smaller than or equal to the smallest threshold among the N predetermined or (pre) configured energy thresholds for ESR reporting. In such case, the UE 116 can determine to not provide the ESR.

For example, $E_{ESR}$ can be defined as $E_{ESR}$=P·T, wherein P is a transmission power for a PUSCH or PUCCH that provides the ESR, and Tis a time duration in a certain time unit, such as in symbols or slots or milli-second, for transmission of the PUSCH or the PUCCH. For example, the UE 116 determines P based on existing uplink power control formulas as described in [REF3, TS 38.213 v17.4.0] or with modifications to accommodate UEs that report ESR, such as A-IoT UEs operating with energy harvesting or other UEs with random or time-varying output energy levels.

For example, when the UE 116 has been provided resources for transmission of a signal/channel with ESR and the UE 116 does not transmit the signal/channel for a triggered ESR due to energy shortage as determined for example using any of the methods described herein. The gNB 102 can determine a lowest energy level/range for the UE 116 by detecting an absence of a signal/channel reception in the resources. Therefore, when the UE 116 does not transmit a signal/channel with ESR, the gNB 102 can interpret a discontinuous transmission (DTX) detection for the signal/channel in corresponding resources as an ESR with the smallest energy level/range.

The UE 116 behavior for whether or not to provide an ESR report depending on an available energy can be defined in the specifications of the system operation or can be indicated from a serving gNB, for example together with an aforementioned energy threshold.

Figure 14:
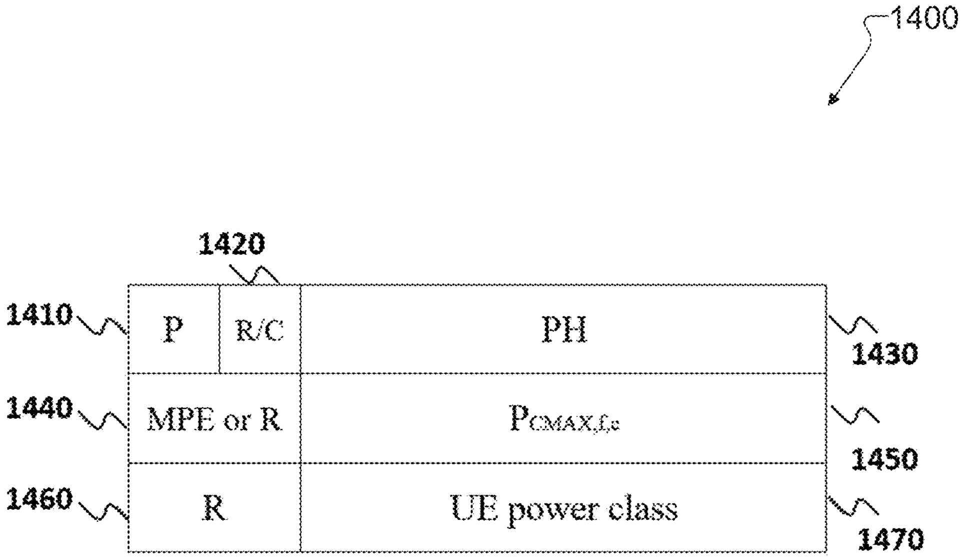
FIG. 14 illustrates a diagram for PHR formats according to embodiments of the present disclosure.

FIG. 14 illustrates a diagram 1400 for PHR formats according to embodiments of the present disclosure. For example, diagram 1400 for PHR formats can be utilized by the UE 116 of FIG. 3. This example is for illustration only and other embodiments can be used without departing from the scope of the present disclosure.

Existing fields (1410, 1420, 1430, 1440, and 1450) in a PHR format as described in [REF6, TS 38.321, v17.3.0] are retained, and an additional field (1470) is added to provide a UE power class. Herein, UE power class is taken as the UE energy buffer level after PHR transmission, to indicate ESR. For example, the UE 116 power class is provided using 6 bits, 1470, and the first two bits of the additional octet are set to reserved, 1460. In one option, a second bit in the first octet (1420) can be set to "reserved" as in [REF6, TS 38.321, v17.3.0] in which case the third octet (1460 and 1470) is present. In another option, the second bit in the first octet (1420) can be set to a one-bit flag such as (to make the third/last octet as optional, such that a value 1 for the field C indicates that the last/third octet for UE power class (1460 and 1470) is present, and a value 0 for the field C indicates that the third/last octet for UE power class (1460 and 1470) is not present.

In one embodiment, a UE can report an ESR using L2 signaling, such as by a modified/new type of power headroom report (PHR), such as by re-interpreting the $P_{CMAX,f,c}$ field or the MPE field or by adding a new field for UE power class, or by a new MAC-CE command.

A power headroom report (PHR), as described in [REF6, TS 38.321, v17.3.0], may be used by a UE to provide to a gNB information about, for example:

- A pathloss or RSRP measurement based on a DL RS (or variations thereof), or
- Power back-off terms, such as maximum power reduction (MPR), A-MPR, P-MPR, and so on, as selected/determined by the UE 116.

For a "virtual" PHR relative to a reference format (rather than an actual PUSCH transmission), the latter information may not be applicable, and the UE 116 may provide by the PHR only the former information for a pathloss measurement.

For a UE with time-varying or random energy level, such as based on energy harvesting that can be regarded as a random process, a PHR mechanism may not be suitable or sufficient since a constant or known value of $P_{CMAX,f,c}$ may not be applicable. Therefore, a modified or new PHR or a new MAC-CE command can be used for ESR reporting.

In one realization, ESR is provided via a power headroom report (PHR), such as by re-interpreting the PHR or by a modified/new type of PHR with additional fields.

In a first option, a PHR with a same format as defined in [REF6, TS 38.321, v17.3.0] may be used by a UE to report an ESR, where the $P_{CMAX,f,c}$ field can be re-used or replaced and be used by the UE 116 to provide the ESR. For example, the UE 116 can be assumed to not apply power back-off terms, such as no MPR/A-MPR/P-MPR, or any power saving policy to save energy in the energy storage unit (for example, the UE 116 transmits with full/max power), and then $P_{CMAX,f,c}$ is same as a UE power class. For an A-IoT UE, a reference power class can be defined, or a power class can be same as an energy buffer level or ESR (such as an energy buffer level before/when transmitting a PUSCH or PUCCH that provides the ESR). In another example, the UE 116 may use the $P_{CMAX,f,c}$ field in the PHR format to provide the ESR even though the UE 116 may also apply power back-off or a power saving policy as described herein. For example, one additional bit (or one bit from the 6 bits for the $P_{CMAX,f,c}$ field) can be used to indicate whether or not the UE 116 has applied any power back-off terms or any power saving policy for the signal/channel transmission with the ESR.

The values {PCMAX_C_00, PCMAX_C_01, PCMAX_C_02, . . . , PCMAX_C_63} for "Nominal UE transmit power level" defined in [REF10, TS 38.133, Table 10.1.18.1-1] (replicated in the present disclosure as Table 4) that provide a value for the $P_{CMAX,f,c}$ field in the PHR may be re-used or replaced with new values, such as up to 64 values between (−30) dBm and 0 dBm or fewer values in such range. For example, less than 64 values may be used, and remaining values may be reserved. For example, the UE 116 provides the PH field in the PHR format as defined in [REF3, TS 38.213, v17.4.0], based on a difference of $P_{CMAX,f,c}$ with a calculated power for a PUSCH/PUCCH/SRS transmission or a reference power for a reference transmission.

In a second option, a 2-bit field used as "MPE or R" in the existing PHR format as defined in [REF6, TS 38.321, v17.3.0] can be re-interpreted to provide the ESR. For example, when the UE 116 is (pre-)configured by OAM, or provided a SIB parameter or an RRC parameter such as "esr-in-phr", or when the [A-IoT] UE is operating in the INACTIVE state, the 2 reserved bits of the PHR format can be used to provide the ESR. For example, the field can be renamed as "MPE or R or ESR". For example, the 2 bits point to a value from a predetermined or a (pre)configured table with 4 values for the energy status level.

In a third option, a new/modified PHR format may be used, wherein the PHR format includes an (additional) field for a UE power class or a UE energy buffer level, as shown in FIG. 14. Herein, the UE 116 power class can indicate the energy buffer level of the UE 116, such as an energy level before or after the UE 116 provides the new/modified PHR. For example, the new/additional field can indicate the UE energy buffer level after transmitting the new/modified PHR. For example, the new/modified PHR can include an additional one-bit flag to indicate whether the indicated ESR is based on the UE energy buffer level before or after transmitting the new/modified PHR. For example, the field for the UE 116 power class can provide a value with up to 6 bits, wherein the value points to an entry from a predetermined or configured table with up to 64 values for the UE 116 power class, namely, the energy buffer level (or ESR) of the UE 116. For example, the predetermined or configured table can include up to 64 values, or fewer values, between (−30) dBm and 0 dBm. Other fields in the PHR format, such as $P_{CMAX,f,c}$ or "MPE or R" or PH fields, can be maintained and used as described in [REF6, TS 38.321, v17.3.0].

In one example, a value provided as power class is related to a UE energy buffer level based on a reference time duration, such as T time units, so that E=P·T, wherein E is the energy buffer level, P is the indicated power class and Tis the reference duration. For example, T can be provided in symbols or slots or in absolute time units such as T millisecond. For example, T=1 symbol or 1 slot. For example, T=1 milliseconds, or T=10 or 100 or 500 milliseconds. For example, a value of T can be predetermined in the specifications of system operation or can be provided by common or UE-dedicated RRC information/signaling. For example, the UE 116 can be provided a predetermined or (pre) configured set of time durations and the UE 116 can be indicated an index of a time duration from the set of time durations. For example, the new/modified PHR can include an additional field for indication of the time duration or duty cycle, such as a value of the time duration or an index of a time duration from a set of predetermined or (pre)configured time durations/duty cycles.

In one example, a value provided for ESR can be in terms of energy units, such as Joules, so a corresponding indication, such as field in MAC-CE, can include a value in a range of energy values, such as a value from a 1 milli-Joules to 1,000 milli-Joules. For example, the UE 116 can be provided a predetermined or configured table with up to 64 values, or fewer values, between 1 milli-Joules to 1,000 milli-Joules. In another example, the specifications of system operation can be provided multiple tables, such as two tables, corresponding to different UE types/capabilities (for example, for A-IoT UEs with different sizes of capacitor/energy storage unit), and the UE 116 provides the ESR based on the respective UE type/capability or based on gNB configuration.

Methods herein for conversion between power and energy levels can apply to various other embodiments and examples discussed throughput the present disclosure.

The re-interpretations of PHR or the new/modified PHR as described herein can be applicable at least for a certain class of UEs with variable output power level, such as A-IoT UEs (and may not be applicable to other classes/types of UEs with constant power level). Based on the specifications of the system operation or based on higher layer configuration or based on L1/L2 indication, a UE can report PHR only based on such re-interpreted/new/modified PHR format, or in addition/alternatively based on existing PHR formats, for example as described in in [REF6, TS 38.321, v17.3.0].

When ESR is provided via a modified/new ESR using any of the methods, some, or all triggers for ESR transmission, such as those described in one or more examples herein are regarded as triggers for PHR in addition to the existing PHR triggers as described in [REF6, TS 38.321, v17.3.0].

Figure 15:
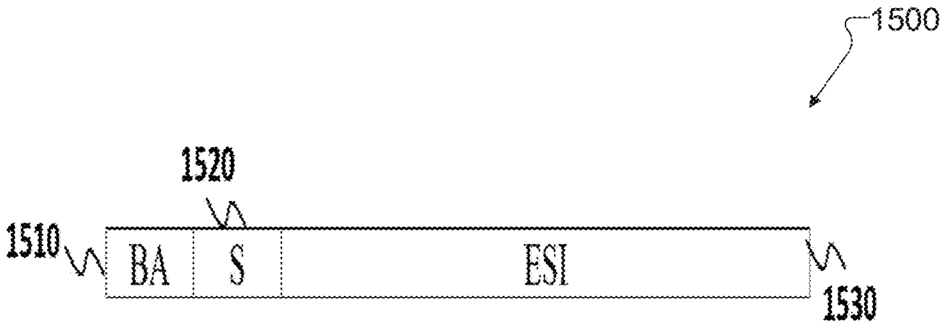
FIG. 15 illustrates a diagram of MAC CE for ESR transmission according to embodiments of the present disclosure.

FIG. 15 illustrates a diagram 1500 of MAC CE for ESR transmission according to embodiments of the present disclosure. For example, diagram 1500 of MAC CE for ESR transmission can be utilized by any of the UEs 111-116 of FIG. 1. This example is for illustration only and other embodiments can be used without departing from the scope of the present disclosure.

A one-bit field BA (1510) indicates whether the UE 116 energy level provided by the ESI field indicates a value before or after transmission of the ESR MAC-CE (and corresponding PUSCH). For example, a value 0 indicates before transmission of a channel with the ESR MAC CE, and a value 1 indicates after transmission of the channel with the ESR MAC CE. A one-bit S (1520) indicates, in case the BA field (1510) provides a value 0, whether the UE 116 applied any UE power saving policy. For example, a value 0 for the field S indicates no application of a UE power saving policy and a value 1 indicates application of the UE 116 power saving policy. When the BA field (1510) indicates that UE energy buffer report (1530) is for after the ESR MAC-CE transmission, the field S (1520) can be reserved. The 6-bit field ESI (1530) provides the energy buffer level of the UE 116.

In another realization, ESR is provided by a MAC CE that is separate from a MAC CE providing PHR. For example, ESR can be provided in a new MAC-CE that is included in a PUSCH transmission.

For example, a new ESR MAC-CE can include one octet, including for example:

- a first field with N bits, such as 6 bits, for ESR, to indicate one of up to 2N levels, such as 64 levels or ranges for the UE energy buffer. For example, the up to 64 levels or ranges can be predetermined in the specifications of system operation or can be provided by higher layer configuration. For example, the up to 64 levels can be same as or a subset of those provided in Table 4 for $P_{CMAX,f,c}$;
- a second field with M bits, such as 1 bit, to indicate a time reference for the reported ESR such as before or after the ESR MAC-CE transmission;
- a third field with K bits, such as 1 bit, to indicate whether or not the UE 116 applied any power saving policy, such as not transmitting with a required level for power/energy for providing the ESR MAC-CE although the UE 116 had additional energy available and decided to save/store some energy for future use.

For example, the third field may be optionally present, such as be present only when the second field indicates that the reported ESR corresponds to the UE 116 energy level before the ESR transmission; otherwise, the third field is ignored/reserved. In another example, the third field is not present and is set to reserved. In another example, neither the second field nor the third field are present, and both are set to reserved.

A UE may or may not combine reporting for ESR and PHR. In one example, ESR and PHR reporting are independent, and a UE may provide any or both corresponding MAC-CEs. In another example, in order to reduce payload and improve reception reliability, a UE may report only one, but not both, of the corresponding MAC-CEs. For example, ESR reporting can be prioritized based on the specifications of system operation or based on indication by higher layers. For example, the UE 116 can determine whether to report one of ESR or PHR. For example, a trigger or transmission of a new MAC-CE for ESR can be evaluated as a condition to cancel a PHR trigger or transmission.

The UE 116 includes a modified/new PHR that accommodates energy buffer reporting or a new MAC-CE for ESR as a MAC header/packet in a PUSCH transmission, with or without data payload/UL-SCH from higher layers.

In one embodiment, a UE can report ESR as L1 uplink control information (UCI). the UE 116 can provide the ESR in a PUCCH transmission or can include/multiplex the ESR in a PUSCH transmission.

For example, the contents of ESR as L1 UCI can include an index for a UE energy buffer level, such as based on short/long/extended ESR, as described one or more examples herein, or can be same as that evaluated for a new MAC-CE as described in one or more examples herein.

For example, ESR can be provided as a new UCI type that is included in a PUCCH transmission. For example, the PUCCH can include only the ESR or can additionally include/multiplex other UCI types, such as CSI, SR, or Hybrid automatic repeat request acknowledgement (HARQ-ACK) report. For example, a PUCCH transmission can include a periodic PUCCH or a PUCCH that is indicated (for HARQ-ACK feedback transmission) in a DL scheduling DCI.

For example, ESR can be provided as a UCI that is multiplexed in a PUSCH transmission. For example, the PUSCH transmission can be:

- a Msg3 PUSCH (re)transmission, or
- a PUSCH scheduled by a DCI format, or
- a CG PUSCH Type-1 or Type-2, including CG PUSCH provided by SDT operation, or
- a PUSCH transmission associated with a PRACH, such as MsgA PUSCH for 2-step RACH or PUSCH occasions provided for SDT operation, or
- one or multiple PUSCH occasions triggered by an LP-WUS.

For example, a time/frequency resource for a PUCCH or PUSCH that provides ESR can be provided by common or UE-specific RRC information/signaling.

For example, when ESR includes only 1-2 bits, the UE 116 can provide the ESR in a PUCCH format 0 or 1 as defined in [REF1, TS 38.211] and [REF3, TS 38.213]. For example, when ESR includes more than 2 bits, the UE 116 can provide the ESR in a PUCCH format 2 or 3 or 4 as defined in [REF1, TS 38.211] and [REF3, TS 38.213]. For example, different parameters for a PUCCH format that provides the ESR, such as a phase rotation/cyclic shift, an orthogonal cover code or an orthogonal sequence for code-multiplexing, a scrambling sequence, or a corresponding ID, can be UE-specific or commonly provided for a group of UEs. Similar methods can apply for a PUSCH that provides an ESR.

In one example, an ESR can be triggered for a UE by a DCI format that schedules a PDSCH, such as a DCI format 1_0/1_1/1_2, and the UE 116 can provide information for the ESR as for HARQ-ACK information. For example, the DCI format can include a second PUCCH resource indicator (PRI2) field or a second PDSCH-to-ESR timing (K1_ESR) field that are separate from a first PRI field or a first PDSCH-to-HARQ feedback timing (K1) that are provided for reporting a HARQ-ACK information corresponding to the PDSCH. In another example, the first PRI and the first K1 field apply to both HARQ-ACK information and ESR so the UE 116 multiplexes both HARQ-ACK information and ESR in a same PUCCH. In another example, a UE can be provided a time offset (in symbols or slots or absolute time units, such as milliseconds) by RRC and provides the ESR in an earliest available/valid slot with a resource that is after a value indicated by the first K1 field by a number of slots that is larger than or equal to the time offset. In another example, the UE 116 provides the ESR in an earliest available/valid slot with a resource that is after a slot in which the UE 116 received the DCI format by a number of slots that is larger than or equal to the time offset.

In one example, the UE 116 can provide ESR as for a scheduling request (SR), possibly with modifications specific to ESR reporting. For example, the UE 116 can be provided a PUCCH configuration for ESR reporting. For example, the UE 116 can apply different modulations such as Quadrature Phase Shift Keying (QPSK) or pi/2 Binary Phase-shift keying (BPSK) to a base sequence or a non-DMRS part of a PUCCH transmission to indicate one or multiple ESR values. For example, the UE 116 can be provided a set of base sequences or a set of time/frequency resources for ESR reporting over PUCCH with N different elements such as N=2 or 4 in the set. For example, similar to PUCCH format 0 as described in TS 38.211 v17.4.0, the UE 116 can indicate one of N levels for ESR by selecting a sequence or a resource from the set of sequences or resources. For example, different ESR values can be mapped to different values of a PUCCH parameter, such as a cyclic shift or a phase rotation or a scrambling sequence or an orthogonal cover code.

In one example, when the UE 116 determines a trigger for ESR and the UE 116 does not have UL resources that are required for providing an ESR, the UE 116 triggers a scheduling request (SR), such as by a PRACH or by a PUCCH dedicated to ESR. In another example, the UE 116 can provide the ESR in a PUCCH resource configured for SR, possibly along with an indication that the information is for an ESR or an SR for example by according modulating a transmitted sequence or by applying a phase rotation or a cyclic shift or other PUCCH parameter for ESR that is separate from ones for SR. In another example, the UE 116 can multiplex both SR and ESR in a same PUCCH and apply a phase rotation or a cyclic shift or other PUCCH parameter that corresponds to SR+ESR combination, that can be different from those for SR only or for ESR only.

In one example, a priority level or index, such as priority level 0 or 1, can be provided for a PUCCH or a PUSCH that provides an ESR. The UE 116 applies such priority level when multiplexing different UCIs in a PUCCH or PUSCH, or when determining a PUCCH or PUSCH for UCI multiplexing, including dropping PUCCHs or PUSCHs with smaller priority. For example, the priority level can be provided by an RRC configuration for a PUSCH or PUCCH that provides the ESR or a configuration of a trigger for ESR, or can be indicated in a DCI format, or by a sequence such as an LP-WUS that triggers the ESR. For example, an ESR that is triggered by a change of UE energy buffer level beyond a certain threshold can be set to high/large priority, while an ESR that is triggered based on periodic timer can be set to low/small priority. For example, a priority level for ESR can be the same, such as always high priority (or always low priority), regardless of a trigger for ESR or a mechanism for providing the ESR. For example, a priority for ESR can take only two values, such as by a value "true" or its absence (or a value "false"). For example, when a priority level is not provided for an ESR, the UE 116 applies a low priority for the ESR.

In one embodiment, a UE can transmit a PUSCH or PUCCH that includes the ESR using OFDM waveform or using a low-power waveform, such as an On-Off keying (OOK) or frequency shift keying (FSK) waveform. In addition, other methods for reduced power consumption may be used, such as DFT-s-OFDM waveform or pi/2-BPSK modulation. Moreover, for a UE without active RF components, the UE 116 can transmit ESR by modulating the information bits corresponding to ESR on the received DL waveform and backscattering the modulated waveform.

In one example, when a UE operates with a reduced-cost or low-power radio (LR), the UE 116 may not be capable of multi-carrier waveforms such as OFDM. Therefore, the UE 116 may operate with a single-carrier waveform, with UL transmissions that are based on, for example, on-off keying (OOK) or frequency shift keying (FSK) or phase shift keying (PSK) and so on. In one example, an FFT/OFDM-based structure may be used for transmission of such low-power waveforms.

In another example, the UE 116 operates with multi-carrier waveforms, such as OFDM, for transmitting a PUSCH or PUCCH that provides the ESR, but applies other method for reducing power consumption, such as using DFT-s-OFDM waveform, or using pi/2-BPSK or pi/4-QPSK modulation.

In another example, a UE without active RF components may not generate its own waveform and operate by backscattering. For example, the UE 116 receives a trigger signal or channel, such as LP-WUS, then modulates the ESR information bits on top of the received waveform and backscatters the modulated waveform. For example, to ensure reasonable detection performance at the gNB 102, few bits such as up to 4 bits can be provided as ESR.

In one example, a number of UEs, such as a number of A-IoT UEs that are associated with a same group, can jointly transmit an ESR (or multiple ESRs) to reduce a transmission power/energy for each individual UE or to improve a reception quality such as SINR of an uplink channel. For example, a group of UE can be indicated same resources, such as same time instances, for example a same PUSCH or PUCCH, for transmission of an ESR. For example, all UEs in the group of UEs transmit a same ESR value in the PUSCH or PUCCH or each UE in the group of UEs transmits a separate ESR corresponding to that UE. For example, the gNB or the Reader UE combines the receptions in the PUSCH or PUCCH for determining a same energy value or an average energy value corresponding to the group of UEs.

In one embodiment, when a UE is operating in a sidelink-like mode, such as when communicating with a "Reader" UE, the UE 116 may transmit the ESR in a PSFCH, PSCCH or a PSSCH to the "Reader" UE and any related signaling can be based on sidelink communication.

For example, a UE can receive its UE-terminated traffic or signaling, such as discovery/trigger signal or scheduling DCI or configuration, from a "reader" UE. For example, the UE 116 transmits its UE-originated traffic or signaling, such as indication of UE ID or of ESR or sensor measurements and so on, to the "reader" UE.

For example, various embodiments, methods, and examples described in the present disclosure can be reused when operating with a "reader" UE by replacing:

gNB with the "reader" UE;

DL/UL with sidelink (SL);

PUSCH/PUCCH with PSFCH/PSSCH/PDCCH; or corresponding link/interface/channel for communication of UE and "reader" UE.

In one example, when a "reader" UE receives ESR from multiple UEs and needs to provide the multiple ESR values (corresponding to the multiple UEs) to the gNB 102, the "reader UE" can apply compression of the multiple ESR values, for example, using a compression codebook or by a joint encoding the multiple values in a single value.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A method of a user equipment (UE) in a wireless communication system, the method comprising:

identifying a condition for providing an energy status report (ESR), wherein the ESR indicates an energy buffer level of the UE;

determining one or more values of an available energy level corresponding to one or more time instances, wherein:

a first value of the available energy level, from the one or more values, at a first time instance, from the one or more time instances, is determined based on a first value of a maximum transmit energy level at the first time instance, and the first value of the maximum transmit energy level is determined based on the first time instance;

determining a first ESR comprising the one or more values of the available energy level and the corresponding one or more time instances;

determining uplink resources for transmission of a first uplink channel with the first ESR; and transmitting the first uplink channel with the first ESR in the uplink resources.

2. The method of claim 1, wherein the condition is a trigger to perform an initial access procedure.

3. The method of claim 1, wherein identifying the condition comprises receiving information indicating the condition in a medium access control control element (MAC CE), in a downlink control information (DCI), or from higher layers.

4. The method of claim 1, wherein:

identifying the condition comprises determining that a change in the first value of the available energy level at the first time instance relative to a second ESR corresponding to a second time instance exceeds a threshold, the second time instance is before the first time instance, the second ESR is a last ESR that is prior to the first ESR, and a transmission of a second uplink channel with the second ESR does not end later than a value of a prohibit timer relative to the transmission of the first uplink channel.

5. The method of claim 1, further comprising:

identifying a number of energy level ranges;

determining a second value of the available energy level corresponding to a second time instance;

determining an energy level range, from the number of energy level ranges, that includes the second value of the available energy level, wherein the energy level range is a lowest energy level range; and skipping transmission of a second uplink channel with a second ESR comprising the second value of the available energy level.

6. The method of claim 1, wherein:

the first time instance is an earliest time instance after the transmission of the first uplink channel with the first ESR, determining the first value of the available energy level corresponding to the first time instance comprises subtraction of at least one of (i) an allocated energy level for transmission of the first uplink channel with the first ESR and (ii) a back-off energy level, from a value of the maximum transmit energy level at a last time instance that is earlier than the transmission of the first uplink channel with the first ESR by an offset value, and the offset value is based on a processing time for the transmission of the first uplink channel.

7. The method of claim 1, further comprising:

receiving a carrier wave (CW); and modulating the first uplink channel on the CW using on-off keying (OOK) modulation, wherein transmitting the first uplink channel comprises backscattering the modulated CW in the uplink resources.

8. A user equipment (UE) comprising:

a processor configured to:

identify a condition for providing an energy status report (ESR), wherein the ESR indicates an energy buffer level of the UE;

determine one or more values of an available energy level corresponding to one or more time instances, wherein:

a first value of the available energy level, from the one or more values, at a first time instance, from the one or more time instances, is determined based on a first value of a maximum transmit energy level at the first time instance, and the first value of the maximum transmit energy level is determined based on the first time instance;

determine a first ESR comprising the one or more values of the available energy level and the corresponding one or more time instances; and determine uplink resources for transmission of a first uplink channel with the first ESR; and a transceiver operably coupled with the processor, the transceiver configured to transmit the first uplink channel with the first ESR in the uplink resources.

9. The UE of claim 8, wherein the condition is a trigger to perform an initial access procedure.

10. The UE of claim 8, wherein:

the transceiver is further configured to receive an information indicating the condition in a medium access control control element (MAC CE), or in a downlink control information (DCI), or from higher layers, and the processor is further configured to identify the condition based on the information.

11. The UE of claim 8, wherein:

to identify the condition, the processor is further configured to determine that a change in the first value of the available energy level at the first time instance relative to a second ESR corresponding to a second time instance exceeds a threshold, the second time instance is before the first time instance, the second ESR is a last ESR that is prior to the first ESR, and a transmission of a second uplink channel with the second ESR does not end later than a value of a prohibit timer relative to the transmission of the first uplink channel.

12. The UE of claim 8, wherein:

the processor is further configured to:

identify a number of energy level ranges;

determine a second value of the available energy level corresponding to a second time instance; and determine an energy level range, from the number of energy level ranges, that includes the second value of the available energy level, wherein the energy level range is a lowest energy level range; and the transceiver is further configured to skip transmission of a second uplink channel with a second ESR comprising the second value of the available energy level.

13. The UE of claim 8, wherein:

the first time instance is an earliest time instance after the transmission of the first uplink channel with the first ESR, to determine the first value of the available energy level corresponding to the first time instance, the processor is further configured to subtract of at least one of (i) an allocated energy level for transmission of the first uplink channel with the first ESR and (ii) a back-off energy level, from a value of the maximum transmit energy level at a last time instance that is earlier than the transmission of the first uplink channel with the first ESR by an offset value, and the offset value is based on a processing time for the transmission of the first uplink channel.

14. The UE of claim 8, wherein:

the transceiver is further configured to receive a carrier wave (CW), the processor is further configured to modulate the first uplink channel on the CW using on-off keying (OOK) modulation, and to transmit the first uplink channel, the transceiver is further configured to backscatter the modulated CW in the uplink resources.

15. A base station comprising:

a processor configured to determine uplink resources for reception of a first uplink channel, and a transceiver operably coupled with the processor, the transceiver configured to receive the first uplink channel in the uplink resources, wherein the processor is further configured to determine, from a first energy status report (ESR) provided by the first uplink channel, one or more values of an available energy level and corresponding one or more time instances, wherein the ESR indicates an energy buffer level of the UE, wherein a first value of the available energy level, from the one or more values, at a first time instance, from the one or more time instances, is based on a first value of a maximum transmit energy level at the first time instance, and wherein the first value of the maximum transmit energy level is based on the first time instance.

16. The base station of claim 15, wherein:

the transceiver is further configured to transmit a trigger for an initial access procedure to be performed, and receive the first uplink channel with the first ESR in response to the trigger.

17. The base station of claim 15, wherein:

the transceiver is further configured to transmit information indicating a condition in a medium access control control element (MAC CE), or in a downlink control information (DCI), or from higher layers, and the condition indicates to provide the first ESR.

18. The base station of claim 15, wherein:

reception of a second uplink channel with a second ESR comprising a second value of the available energy level is skipped when an energy level range, from a number of energy level ranges, that includes the second value of the available energy level is a lowest energy level range, and the second value of the available energy level corresponds to a second time instance.

19. The base station of claim 15, wherein:

the first time instance is an earliest time instance after the reception of the first uplink channel with the first ESR, the processor is further configured to determine a value of the maximum transmit energy level at a last time instance that is earlier than the reception of the first uplink channel with the first ESR by an offset value, by addition of at least one of (i) an allocated energy level for transmission of the first uplink channel with the first ESR and (ii) a back-off energy level, with the first value of the available energy level corresponding to the first time instance, and the offset value is based on a processing time for the transmission of the first uplink channel.

20. The base station of claim 15, wherein:

the transceiver is further configured to receive the first uplink channel as a backscattered carrier wave (CW) in the uplink resources, and the processor is further configured to demodulate the first uplink channel from the CW using on-off keying (OOK) demodulation.

* * * * *